(12) United States Patent
Yasutake et al.

(10) Patent No.: US 8,326,496 B2
(45) Date of Patent: Dec. 4, 2012

(54) MOTION CONTROL DEVICE OF VEHICLE

(75) Inventors: Toshio Yasutake, Toyoake (JP);
Fuminori Kato, Hiroshima (JP); Jouji Nishioka, Hiroshima (JP); Tomohiko Adachi, Hiroshima (JP); Lodewijk Wijffels, Aachen (DE); Oliver Nehls, Aachen (DE)

(73) Assignee: Advics Co., Ltd., Aichi (JP)

( * ) Notice: Subject to any disclaimer, the term of this patent is extended or adjusted under 35 U.S.C. 154(b) by 239 days.

(21) Appl. No.: 12/705,842

(22) Filed: Feb. 15, 2010

(65) Prior Publication Data

US 2010/0211271 A1 Aug. 19, 2010

(30) Foreign Application Priority Data

Feb. 13, 2009 (JP) ................................ P2009-031290

(51) Int. Cl.
*G06F 7/00* (2006.01)

(52) U.S. Cl. ................................ 701/48; 701/41; 701/70

(58) Field of Classification Search ..................... 701/42, 701/41, 70, 48, 83; 303/125, 132, 140, 146
See application file for complete search history.

(56) References Cited

U.S. PATENT DOCUMENTS

2008/0208409 A1* 8/2008 Matsumoto et al. ............ 701/41
2009/0276124 A1* 11/2009 Suzumura et al. .............. 701/42

FOREIGN PATENT DOCUMENTS

JP 3-227762 A 10/1991

* cited by examiner

*Primary Examiner* — Mary Cheung
*Assistant Examiner* — Jerrah Edwards
(74) *Attorney, Agent, or Firm* — Buchanan Ingersoll & Rooney PC

(57) ABSTRACT

A motion control device of a vehicle comprises: a steering angle controller which controls a steering angle of a steered wheel so that an actual turning controlling variable becomes a target turning controlling variable; and a braking force controller which controls a vehicle braking force so that the actual turning controlling variable becomes the target turning controlling variable. The control of the steering angle controller is stopped by detecting a timing with which the braking force controller detects an oversteering state of the vehicle to start a braking force control.

13 Claims, 19 Drawing Sheets

MOTION CONTROL DEVICE OF VEHICLE

BACKGROUND

The present invention relates to a motion control device of vehicles, such as an automobile, and particularly, to a motion control device which controls the motion of a vehicle at the time of turning manipulation.

Conventionally, a motion control device including a braking force control device which controls a vehicle braking force so that an actual turning controlling variable becomes a target turning controlling variable is widely known as a kind of motion control device which controls the motion of a vehicle at the time of turning manipulation. In this braking force control device for vehicle stabilization control, at the time of turning manipulation of a vehicle, braking forces applied to right and left steered wheels are individually controlled so as to minimize, for example, the deviation of an actual yaw rate based on an actual steering state of the steered wheels from a target yaw rate based on the steering angle and steering speed of a steering wheel by a driver. For example, for vehicle stabilization control, a system referred to as a so-called dynamic stability control (hereinafter appropriately abbreviated as "DSC") system which is adapted to perform the automatic control of a wheel braking force or the automatic control of engine output in addition to this is also a kind of such a braking force control system.

Additionally, in recent years, in addition to this braking force control, a steering angle control device which controls the steering angle of the steered wheels so that an actual turning controlling variable becomes a target turning controlling variable with respect to the steering angle control of the steered wheels is also put to practical use. In such a steering angle control device, the steering angle of the steered wheels is controlled so as to minimize, for example, the deviation of the actual yaw rate from the target yaw rate at the time of turning manipulation of a vehicle, and thereby, the steering of a driver is assisted. For example, a so-called steering stability control (hereinafter appropriately abbreviated as "SSC") system is also a kind of steering angle control system.

It is usual to minimize any deviation, which cannot be eliminated only by the automatic control of a steering angle, first, by automatically controlling the steering angle of steered wheels, in a case where the deviation (for example, yaw rate deviation) of the actual turning controlling variable from the target turning controlling variable is small, so that an actual turning controlling variable becomes a target turning controlling variable by the steering angle control in a case where the motion control of a vehicle at the time of turning manipulation is performed by combining the above-described steering angle control with the aforementioned braking force control, and by using the braking force control system concurrently and automatically controlling the braking force to each wheel in a case where the deviation (for example, yaw rate deviation) of the actual turning controlling variable from the target turning controlling variable exceeds the operation limit of the steering angle control system (for example, refer to JP-A-3-227762).

In a vehicle including the motion control device which performs the motion control of the vehicle at the time of turning manipulation by combining the steering angle control and the braking force control as described above, in a case where so-called oversteering has occurred at the time of turning manipulation, the steering of a driver is assisted by only the steering angle control from a normal region to a region where the compensation quantity of the yaw moment is relatively small. When the yaw rate deviation becomes large with the progress of the oversteering, and exceeds the operation limit of the steering angle control system, the braking force control system is used together. In this state, however, even if the driver has performed K-turn manipulation, etc. of a steering wheel in order to eliminate or suppress oversteering, since the steering angle control system cooperates with the braking force control system, the behavior of the vehicle does not necessarily respond to the steering wheel manipulation of the driver faithfully, and the driver may feel the sense of incompatibility. Additionally, since both systems are used together, there is a difficulty that the convergence of control when the braking force control is completed is not good.

SUMMARY

The invention was made in view of such technical problems, and the object thereof is to provide a motion control device capable of suitably stabilizing the behavior of a vehicle at the time of occurrence of oversteering, keeping a driver from feeling the sense of incompatibility in a limit region of oversteering, and increasing the convergence of control when the braking force control is completed, in the motion control device which performs the motion control of a vehicle at the time of turning manipulation by combining a steering angle control and a braking force control.

In order to achieve the object, a first aspect of the present invention provides a motion control device of a vehicle comprising:

a steering angle controller which controls a steering angle of a steered wheel so that an actual turning controlling variable becomes a target turning controlling variable; and a braking force controller which controls a vehicle braking force so that the actual turning controlling variable becomes the target turning controlling variable, wherein the control of the steering angle controller is stopped by detecting a timing with which the braking force controller detects an oversteering state of the vehicle to start a braking force control.

A second aspect of the present invention provides the motion control device according to the first aspect, wherein the control timing changing unit changes the transition timing of control according to at least one of a vehicle body speed, a steering speed, a yaw rate deviation and a road surface friction coefficient.

A third aspect of the present invention provides the motion control device according to the second aspect, wherein the control timing changing unit changes the transition timing of control according to at least one of a vehicle body speed, a steering speed, a yaw rate deviation and a road surface friction coefficient.

A fourth aspect of the present invention provides the motion control device according to the first to third aspects further comprising a controlling variable changing unit which gradually changes a controlling variable of the steering angle controller at the time of control stop or control return of the steering angle controller.

A fifth aspect of the present invention provides the motion control device according to the fourth aspect, wherein the controlling variable changing unit gradually changes the controlling variable of the steering angle controller according to at least one of the vehicle body speed, the steering speed, the yaw rate deviation, and the road surface friction coefficient.

According to the first aspect of the invention, in a case where oversteering has occurred at the time of turning manipulation, the steering of the driver is assisted by the steering angle control from a normal region and a region where the compensation quantity of the yaw moment is relatively small to a limit region where the yaw rate deviation becomes large and exceeds the operation limit of the steering angle controller. Additionally, the stability of vehicle behavior can be ensured in the respective regions as the braking force controller operates to control a braking force over a steered wheel in the limit region.

Moreover, since the control of the steering angle controller is stopped on the basis of having detected the timing with which the braking force controller detects the oversteering state of the vehicle to start the braking force control, the driver can be effectively kept from feeling a sense of incompatibility when manipulating the steering wheel in the limit region of oversteering. Additionally, in the limit region, the braking force controller is not used together with the steering angle controller unlike the conventional technique, but acts independently. Thus, the convergence of control when the braking force control is completed also improves significantly.

Additionally, according to the second aspect of the invention, the same operational effects as the first invention can be basically exhibited. Especially, since the motion control device further includes a control transition timing changing unit which changes the transition timing of control of the steering angle controller at the time of control stop or control return of the steering angle controller, the transition timing of control can be suitably set according to the driving conditions, etc. of the vehicle.

Moreover, according to the third aspect of the invention, the same operational effects as the second invention can be basically exhibited. Especially, the transition timing of control can be suitably set according to at least one of a vehicle body speed, a steering speed, a yaw rate deviation, and a road surface friction coefficient that are state quantities which have an effect on the stability of vehicle behavior.

Furthermore, according to the fourth aspect of the invention, the same operational effects as any of the first to third inventions can be basically exhibited. Especially, since the motion control device further includes a controlling variable changing unit which changes the controlling variable of the steering angle controller at the time of control stop or control return of the steering angle controller, the transition of control can be suitably by suppressing a sudden change in controlling variable.

Moreover, according to the fifth aspect of the invention, the same operational effects as the fourth invention can be basically exhibited. Especially, the transition timing of control can be suitably set according to at least one of a vehicle body speed, a steering speed, a yaw rate deviation, and a road surface friction coefficient that are state quantities which have an effect on the stability of vehicle behavior.

DESCRIPTION OP EXEMPLARY EMBODIMENTS

Hereinafter, exemplary embodiments of the invention will be described in detail with reference to the accompanying drawings.

In the following description, as long as there is no particular description, the forward direction of a vehicle shall be defined as the "front", and the "left" and the "right" shall coincide with the left and the right with respect to the forward direction of the vehicle.

Figure 1:
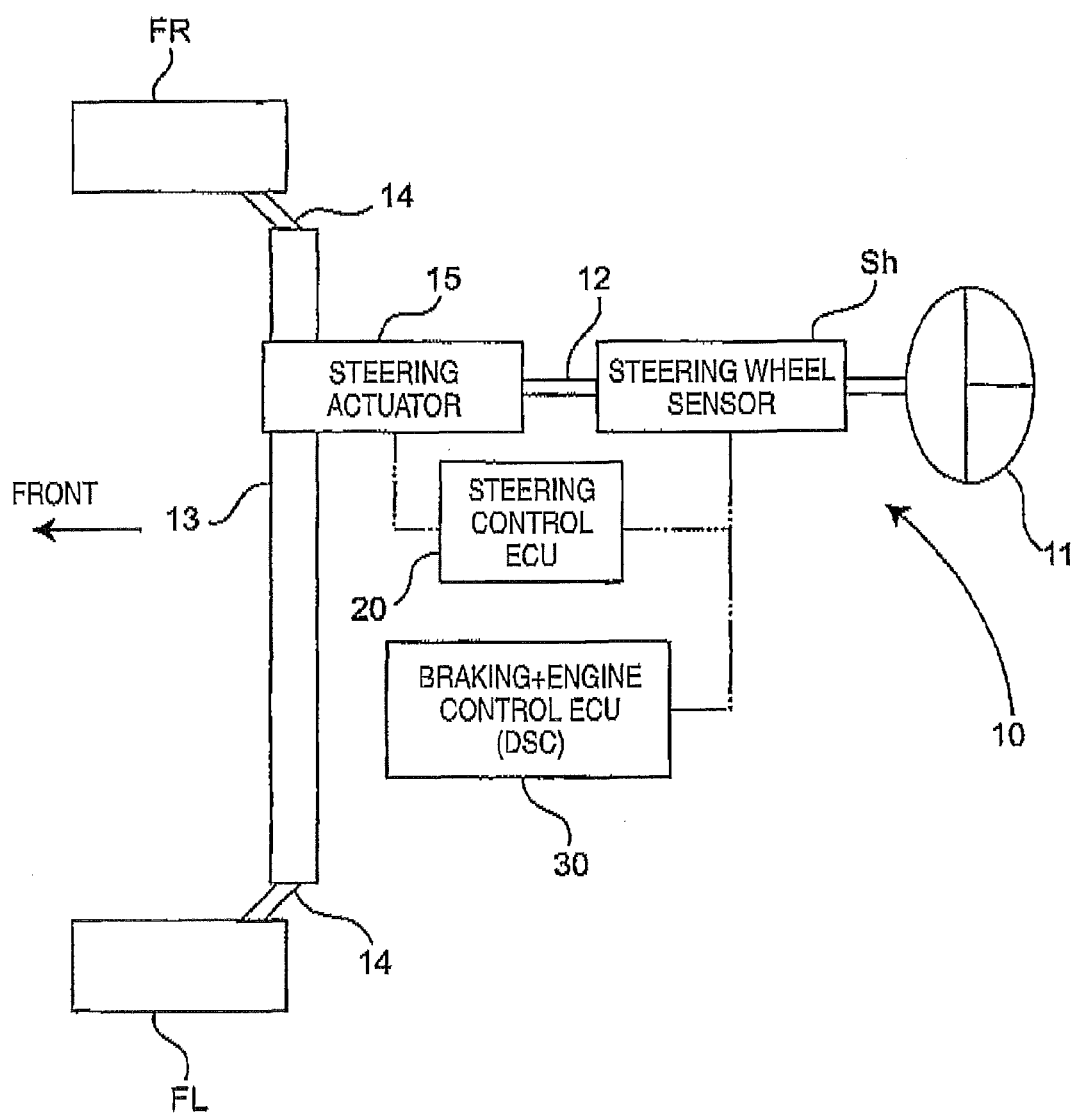
FIG. 1 is a block configuration diagram showing the outline of a front wheel steering apparatus of an automobile including a motion control device according to an embodiment of the invention.
Figure 2:
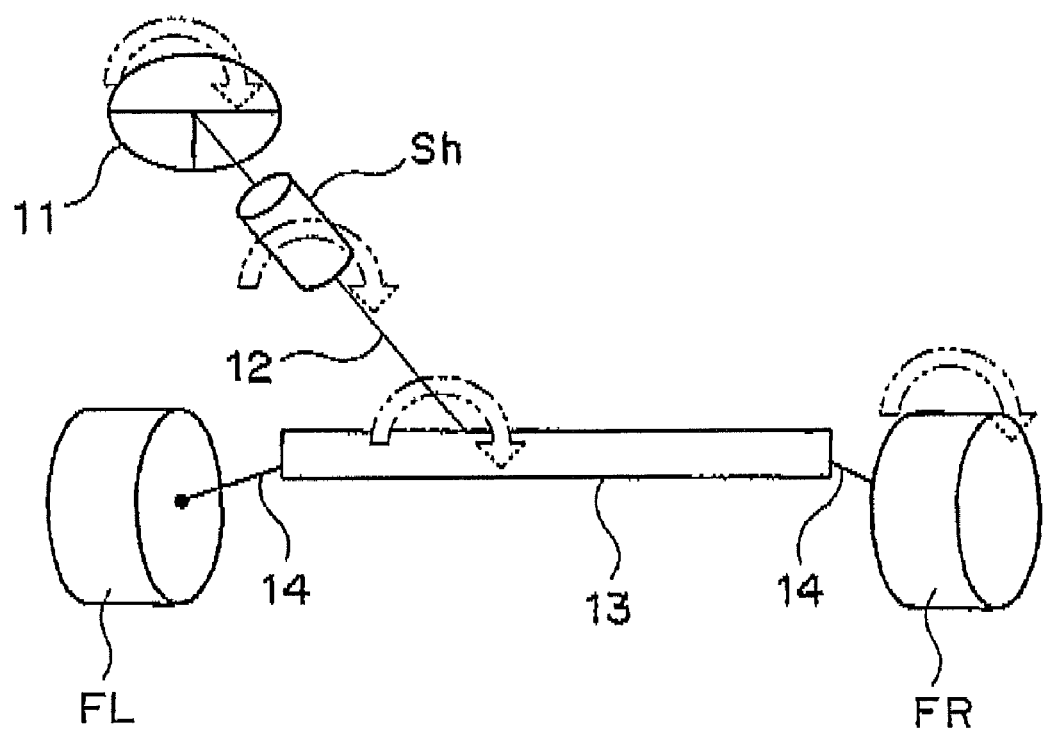
FIG. 2 is a perspective view schematically showing the schematic configuration of the front wheel steering apparatus.

FIG. 1 is a block configuration diagram showing an outline of a front wheel steering apparatus for steering front wheels as steered wheels (also referred to turning wheels) of an automobile including a motion control device according to the exemplary embodiment of the invention, and FIG. 2 is a perspective view schematically showing the schematic configuration of the front wheel steering apparatus.

As shown in these drawings, the front wheel steering apparatus 10 includes a steering wheel 11 which is rotationally manipulated by a driver, a steering shaft 12 which has the steering wheel 11 fixed to and supported on a rear end (right end in FIG. 1) thereof, and a steering actuator 15 which is coupled with a front part of the steering shaft 12.

The front wheel steering apparatus 10 is provided with a tie rod 13 which is movable in the right and left direction of the vehicle by the operation of the steering actuator 15, and a link mechanism unit 14 including a link which turns front right and left wheels FL and FR by the movement of the tie rod 13. Moreover, the front wheel steering apparatus 10 includes a steering wheel sensor Sh which is able to detect the steering angle of the steering wheel 11, and detect the steering speed (steering angle speed) of the steering wheel. All of these respective components are the same as conventionally well-known components.

The steering actuator 15 and the steering wheel sensor Sh are connected to a steering control ECU (Electronic Control Unit) 20 (which will be described later) so that signals can be transmitted and received. The steering control ECU 20 controls the steering actuator 15 in order to adjust the steering angle (Road Wheel Angle: hereinafter refer to as "RWA": also referred to as a "turning angle" or "tire angle") of the front wheels FR and FL to an angle according to the steering angle (Steering Wheel Angle: hereinafter refer to as "SWA") of the steering wheel 11.

A detection signal of the steering wheel sensor Sh is input to a braking and engine control ECU 30 (which will be described later). Both the steering control ECU 20, and the braking and engine control ECU 30 are configured as an electronic control unit including CPU, ROM, RAM (all of which are not shown), etc.

Figure 3:
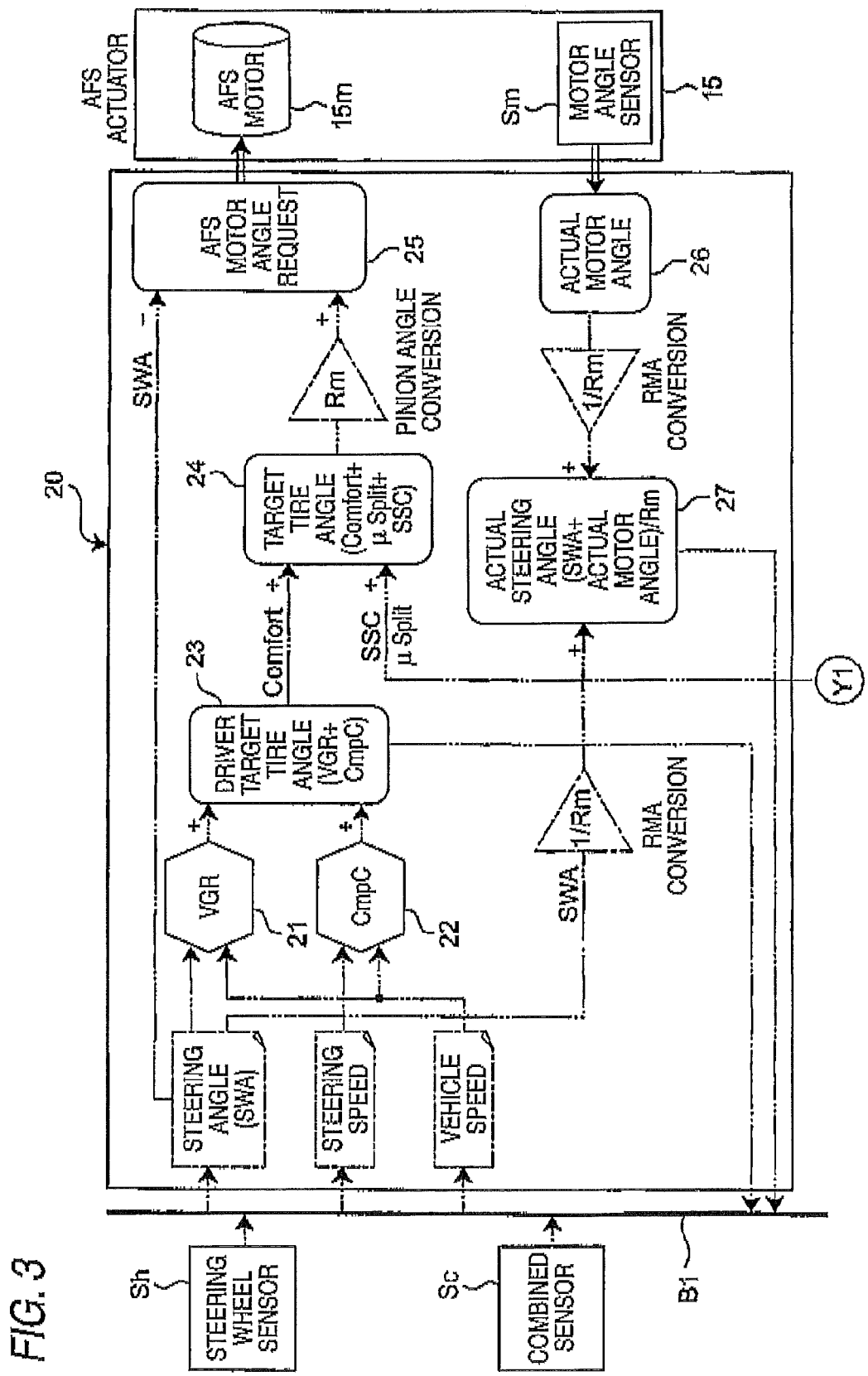
FIG. 3 is a block diagram for explaining the outline of the front wheel steering control by a steering control ECU according to the embodiment.
Figure 4:
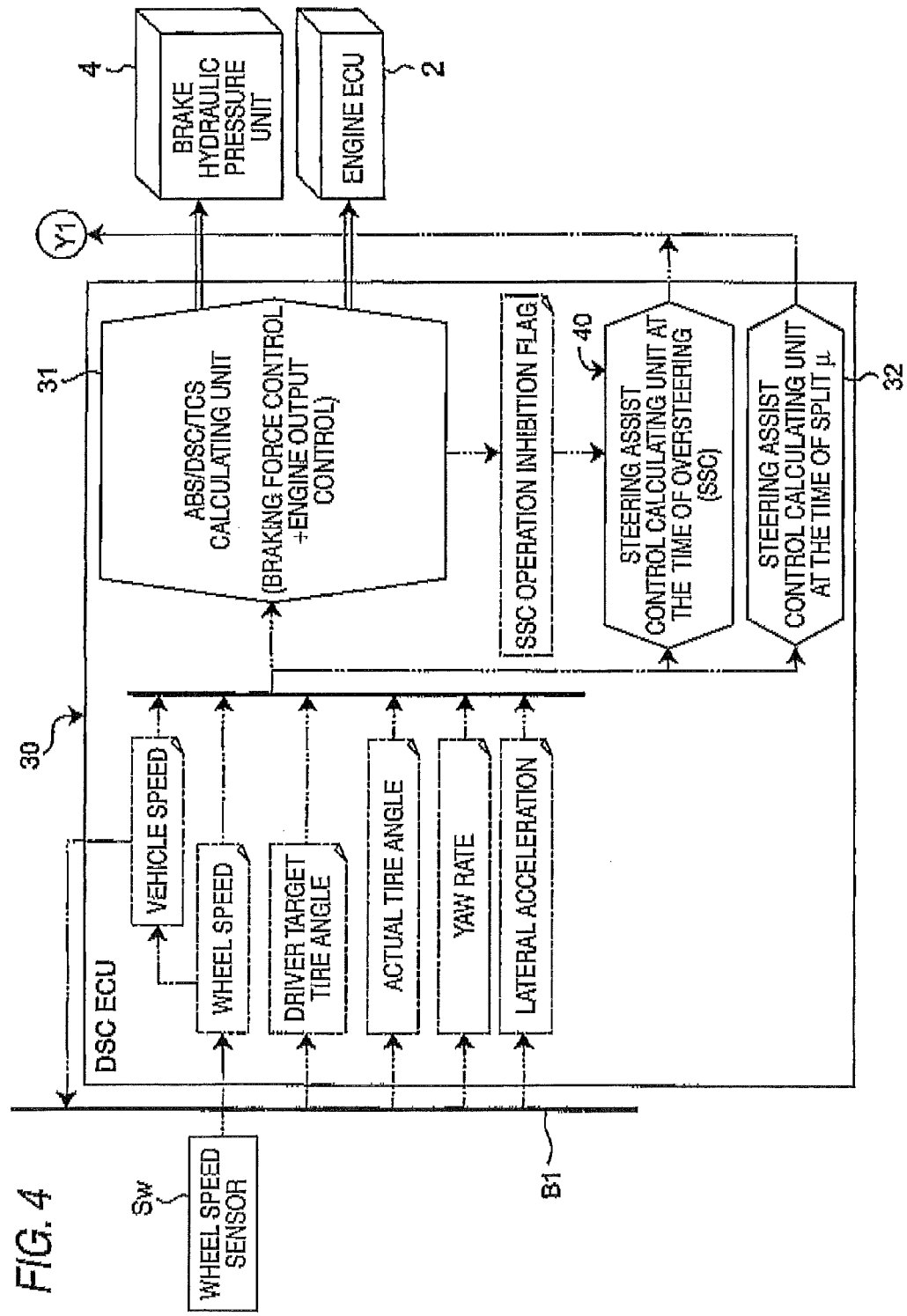
FIG. 4 is a block diagram for explaining the outline of the braking and engine control by a braking and engine control ECU according to the embodiment.

FIG. 3 is a block diagram for explaining the outline of the front wheel steering control by the steering control ECU 20, and FIG. 4 is a block diagram for explaining the outline of the braking and engine control by the braking and engine control ECU 30 according to the embodiment.

The front wheel steering apparatus 10 according to the embodiment includes an electric power steering mechanism which assists a driver in the steering (steering wheel manipulation) of the steering wheel 11 by the driver, and is of a type referred to as a so-called active front steering (hereinafter refer to as "AFS") which is able to calculate a driver target tire angle according to the steering wheel manipulation of the driver, and calculate a target tire angle by adding other control variables in response to the driving conditions of the vehicle so that an actual tire angle becomes the target tire angle. The steering actuator 15, which is also referred to as AFS actuator, includes an AFS motor 15m, and has a motor angle sensor Sm for detecting the motor angle of the AFS motor 15m attached thereto (refer to FIG. 3).

The steering control ECU 20 (refer to FIG. 3), which is also referred to as an AFS ECU, includes a so-called variable gear ratio (VGR) mechanism unit 21 which makes it possible to change a gear ratio showing a ratio of a tire turning angle to a steering wheel steering angle, and a compliance compensation (CmpC) mechanism unit 22 which can accelerate the phase of the tire angle to the steering angle speed, thereby increasing the responsiveness of a vehicle behavior to a steering wheel manipulation.

The steering control ECU 20 includes a driver target tire angle calculating unit 23 which calculates a driver target tire angle according to the steering wheel manipulation of the driver on the basis of a steering angle, a VGR value obtained in the VGR mechanism unit 21, and a CmpC value obtained in the CmpC mechanism unit 22, and a target tire angle calculating unit 24 which calculates a final target tire angle by adding steering assist control variables at the time of split μ and an SSC control variable (which will be described later) to the driver target tire angle.

Figure 8:
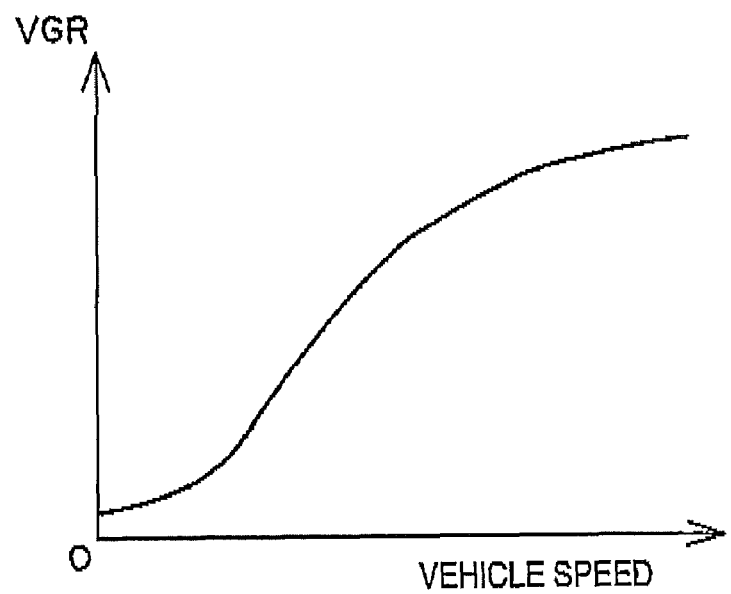
FIG. 8 is a view showing an example of a map for obtaining a VGR value according to a vehicle speed.
Figure 9:
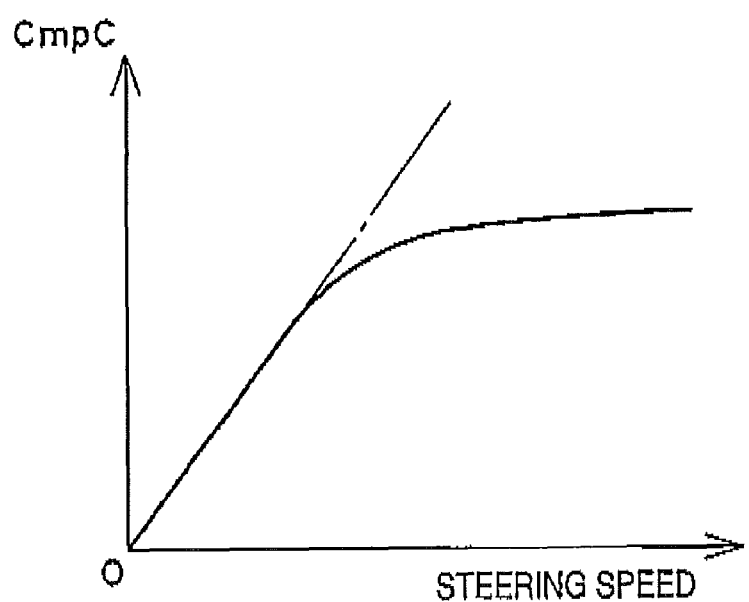
FIG. 9 is a view showing an example of a map for obtaining a CmpC value according to a steering speed.

An example of a map which is used, for example, when a VCR value according to a vehicle speed is obtained, is shown in FIG. 8, and an example of a map which is used, for example, when a CmpC value according to a steering speed is obtained, is shown in FIG. 9. These maps are stored in for example, a ROM provided in the steering control ECU 20. In the map shown in FIG. 8, as the vehicle speed increases, the VGR value becomes large along a predetermined curve. In the map shown in FIG. 9, the CmpC value increases linearly as the steering speed increases until the vehicle speed is within a range of a certain value or less. If the steering speed increases beyond this range, an increase in the CmpC value approaches a saturation state.

The steering control ECU 20 further includes an AFS motor angle request value calculating unit 25 which calculates a request value of an AFS motor angle, on the basis of the value obtained by converting the calculation value of the target tire angle into the pinion angle, and the steering wheel steering angle (SWA) detected by the steering wheel sensor Sh. The AFS actuator 15 (i.e., the AFS motor 15m) is driven on the basis of a request value obtained by the calculation in this AFS motor angle request value calculating unit 25. When the calculation value of the target tire angle is converted into the pinion angle, conversion is performed using Mechanical ratio Rm=Pinion angle/Tire angle (RWA) corresponding to the gear ratio of the rack/pinion of a steering mechanism.

The steering control ECU 20 includes an actual motor angle calculating unit 26 which calculates the actual motor angle of the AFS motor 15m, on the basis of a detection value of the motor angle sensor Sm, and is further provided with an actual steering angle calculating unit 27 which calculates an actual steering angle (an actual tire angle), on the basis of an RWA conversion value obtained by dividing this actual motor angle by the mechanical ratio Rm, and an RWA conversion value obtained by dividing the steering wheel steering angle (SWA) detected by the steering wheel sensor Sh by the mechanical, ratio Rm. The actual tire angle calculation value obtained in this actual tire angle calculating unit 27, and the driver target tire angle calculation value obtained in the driver target tire angle calculating unit 23 are input to the braking and engine control ECU 30 via the bus B1.

The details of the steering control by the above the steering control ECU (AFS ECU) 20 will be described later.

As shown in FIG. 3, the steering wheel sensor Sh is connected to the bus B1, detection signals of the steering wheel sensor Sh, i.e., detection signals of the steering angle SWA, of the steering wheel 11 and the steering speed (steering angle speed) of the steering wheel are input to the steering control ECU 20 via the bus B1. As a sensor which detects the yaw rate of yawing and lateral acceleration which are applied to the vehicle, a so-called combined sensor Sc which has both the functions of a yaw rate sensor and a lateral acceleration sensor is installed in a proper place of the vehicle body, and this combined sensor Sc is also connected to the bus B1.

As shown in FIG. 4, the braking and engine control ECU 30 includes an ABS/DSC/TCS calculating unit 31 which performs required calculations for an anti-locking braking system (hereinafter refer to as "ABS") for the braking control of controlling, mainly, a sideslip, etc. of the wheels at the time of braking, a dynamic stability control (DSC) system for, mainly, vehicle stabilization control, and a traction control system (hereinafter refer to as "TCS") for, mainly, suitable wheel slip control so that suitable braking force control and engine output control according to various vehicle states can be performed.

A wheel speed sensor Sw which is conventionally well-known is connected to the braking and engine control ECU 30. The vehicle speed is calculated on the basis of an input signal (wheel speed signal data) from this wheel speed sensor Sw. The calculation data of the vehicle speed is input to the steering control ECU 20 via the bus B1.

Detection signals of the combined sensor Sc, i.e., detection signals of the yaw rate and lateral acceleration are input to the braking and engine control ECU 30 via the bus B1. Moreover, respective pieces of data of the driver target tire angle and actual tire angle calculated in the steering control ECU 20 are input to the braking and engine control ECU 30 via the bus B1.

The DSC system has the function (appropriately referred to as a "DSC function" in the present specification) of controlling a braking force and/or engine output to the wheel so that the actual turning control variable of the vehicle becomes the target turning control variable at the time of turning manipulation.

The calculation value data obtained in the ABS/DSC/TCS calculating unit 31 is input as a signal to a braking hydraulic pressure unit 4 which controls the braking hydraulic pressure of each wheel, and an engine ECU 2 which controls the operation of an engine itself, and is used for suitable braking force control and engine output control according to vehicle states.

The braking and engine control ECU 30 includes a split μ steering assist control calculating unit 32 which calculates the steering assist control variable for eliminating the unstable behavior of the vehicle caused by the split in a case where so-called split phenomenon that a difference above a predetermined value exists between the values of a road surface friction coefficients (road surface μ) of the right and left wheels during vehicle traveling has occurred (appropriately referred to as a "split μ" in the present specification). The calculation of such steering assist control at the time of split μ is the same as the conventionally well-known content.

Moreover, in this embodiment, the braking and engine control ECU 30 includes a steering assist control calculating unit 40 for oversteering, which calculates a steering assist control variable for eliminating the unstable behavior of the vehicle by this oversteering, in a case where the oversteering has occurred at the time of turning, as a so-called steering stability control (SSC) function capable of controlling the steering angle RWA (also referred to as a turning or a steering angle) of wheels (right and left wheels FL and FR) so that the actual turning control variable of the vehicle becomes the target turning control variable at the time of turning manipulation.

In this embodiment, the DSC system preferably operates to detect an oversteering state even in a case where there is no brake manipulation by the driver. When the timing with which a braking force control is started by the DSC function is detected, the DSC system outputs an SSC operation inhibition flag which inhibits the operation of the SSC control so that the SSC control is stopped or resumes on the basis of this output.

Next, the steering assist control calculating unit 40 will be described at the time of oversteering.

Figure 5:
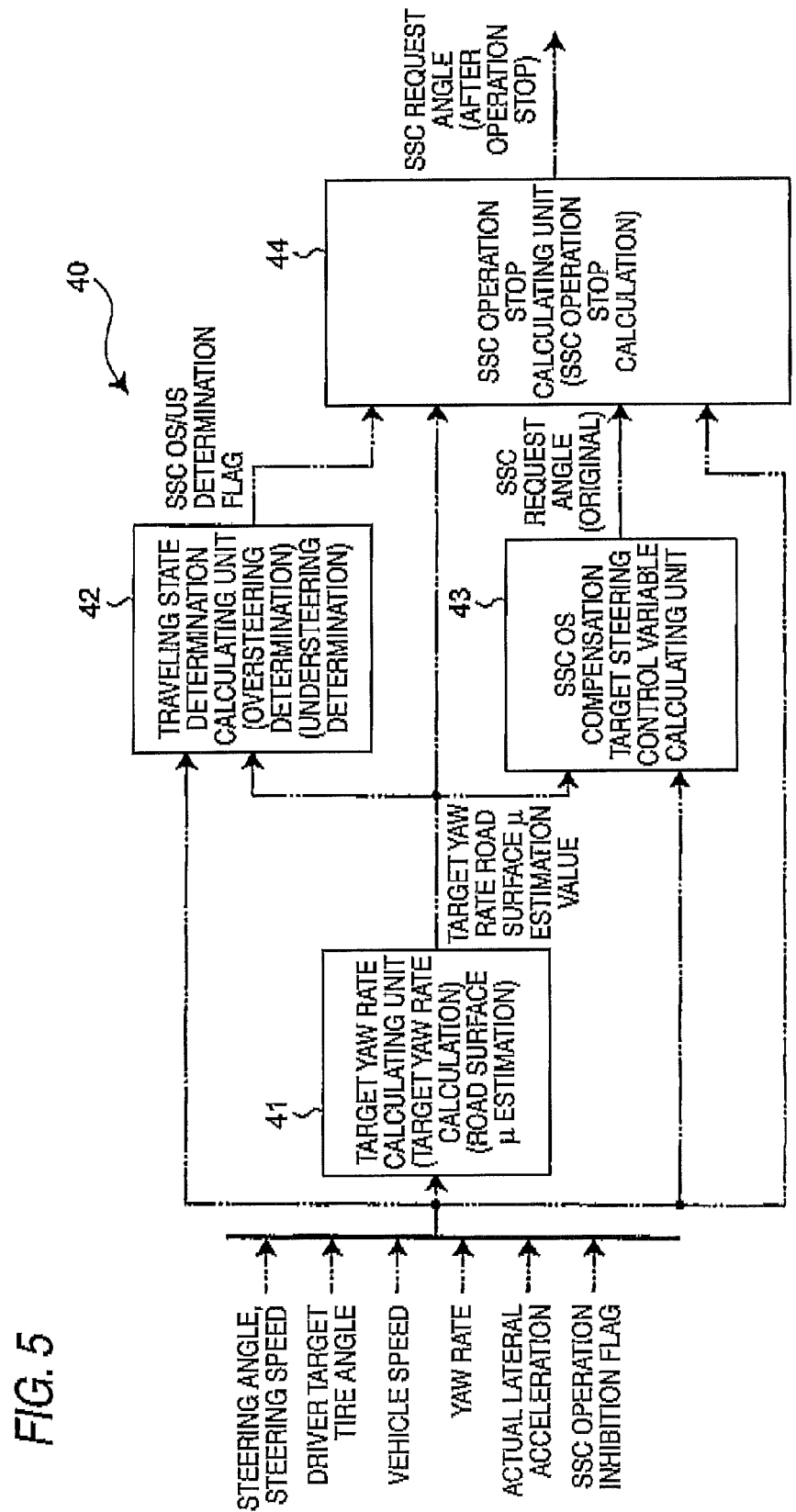
FIG. 5 is a block diagram for explaining the outline of the control by a steering assist control calculating unit at the time of oversteering according to the embodiment.
Figure 6:
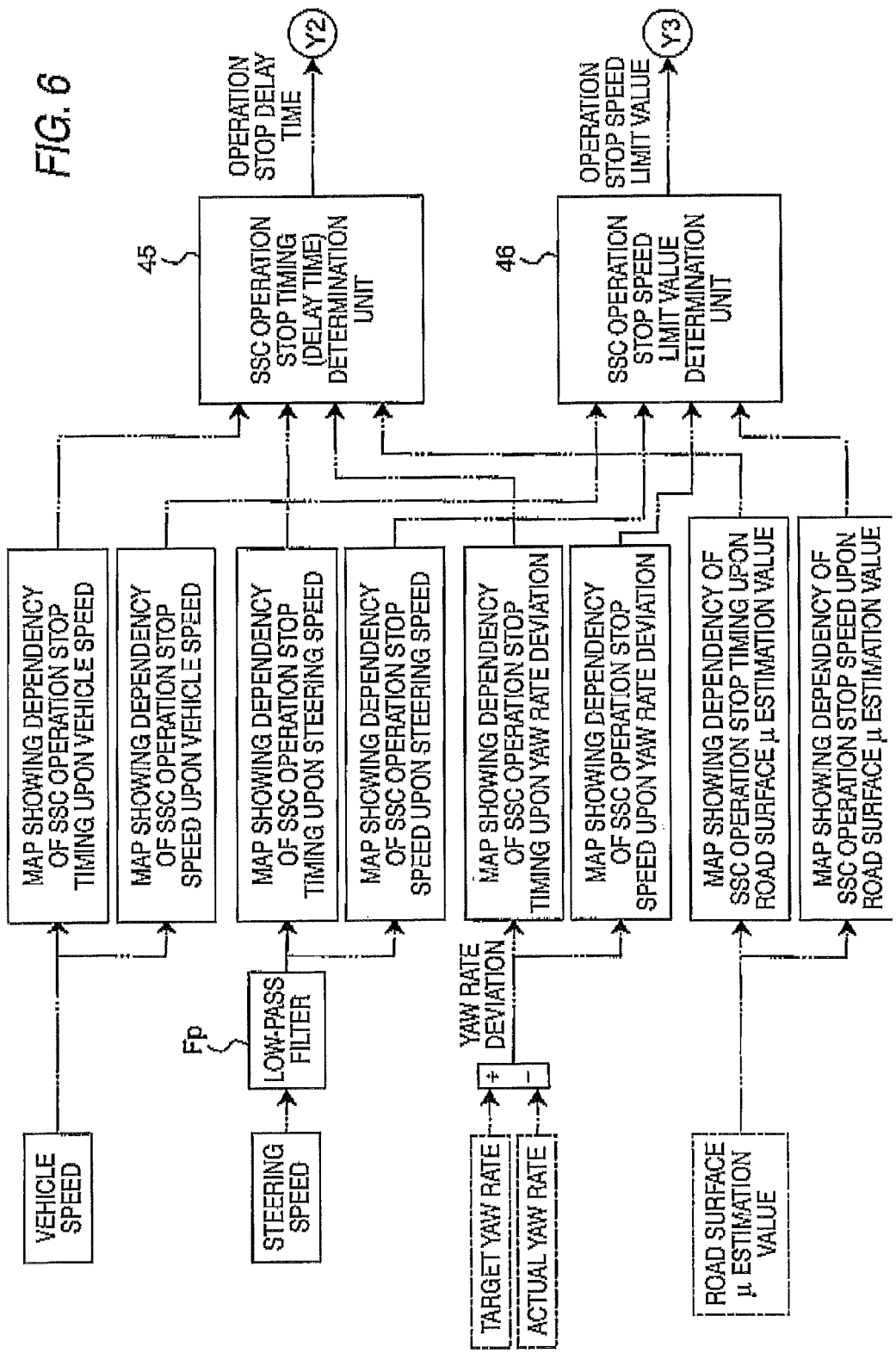
FIG. 6 shows a portion of a block diagram for explaining the outline of the control by an SSC operation stop calculating unit provided within the steering assist control calculating unit at the time of oversteering.
Figure 7:
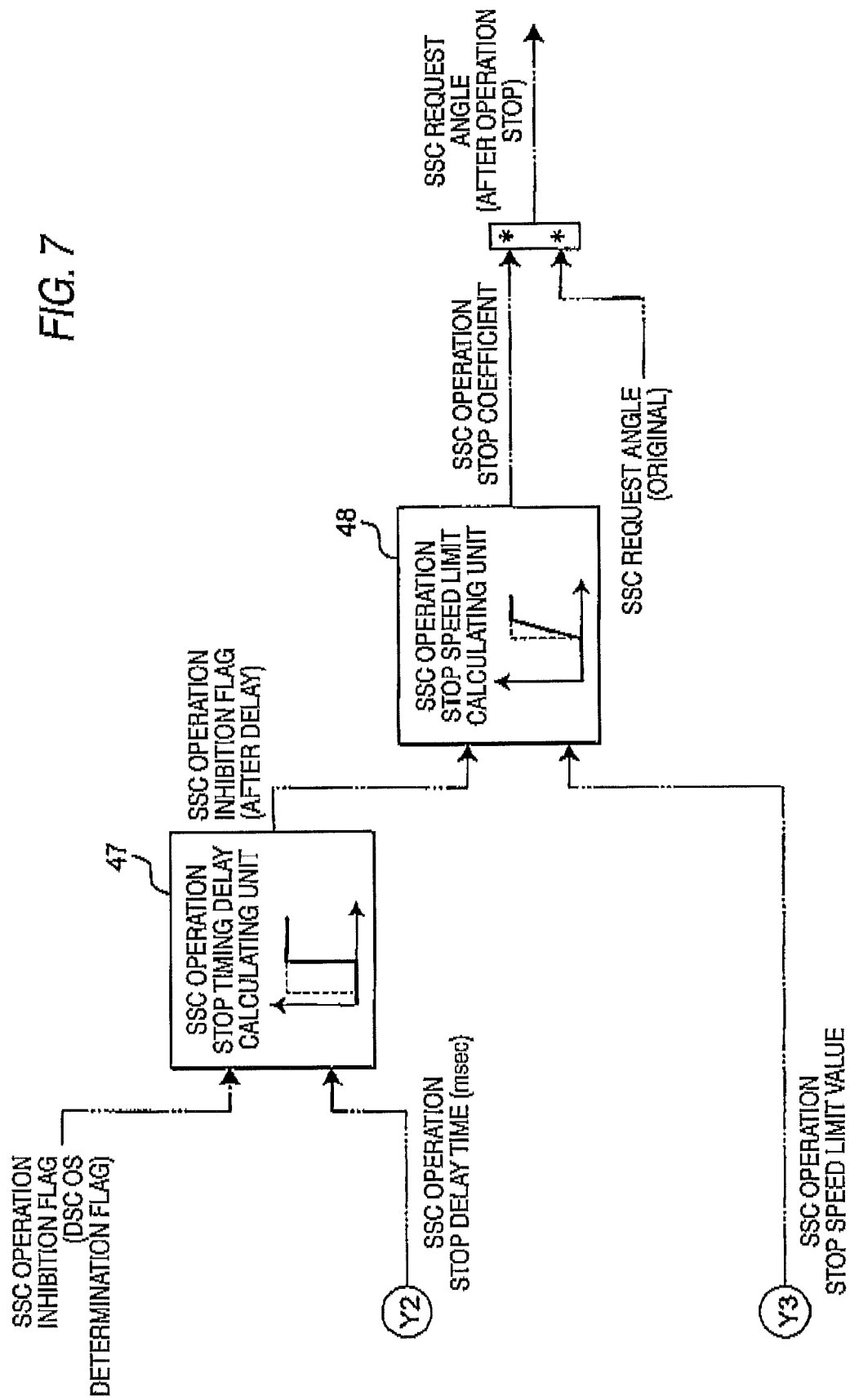
FIG. 7 shows a portion of a block diagram for explaining the outline of the control by the SSC operation stop calculating unit provided within the steering assist control calculating unit at the time of oversteering.

FIG. 5 is a block diagram for explaining the outline of the control by the steering assist control calculating unit 40 for oversteering. FIGS. 6 and 7 are block diagrams for explaining the outline of the control by an SSC operation stop calculating unit provided within the steering assist control calculating unit 40 for oversteering.

As shown in FIG. 5, to the steering assist control calculating unit 40 for oversteering is input respective data signals of the steering angle and steering speed, the driver target tire angle, the vehicle speed, the actual yaw rate, and the actual lateral acceleration, preferably, the SSC operation inhibition flag showing the information on the inhibition of operation of the SSC control. This SSC operation inhibition flag is a flag which changes from (0) to (1) in order to inhibit the operation of the SSC control in a case where the DSC system has detected the timing with which a braking force control is started by the DSC function and which is maintained at (0) in a state where the operation of the SSC control is not inhibited.

The steering assist control calculating unit 40 for oversteering includes a target yaw rate calculating unit 41 which calculates a target yaw rate, a traveling state determination calculating unit 42 which performs oversteering determination and understeering determination in the SSC control, an SSC OS compensation target steering control variable calculating unit 43 which calculates a target steering control variable of the oversteering (OS) compensation by an SSC function at the time of occurrence of oversteering (OS), and an SSC operation stop calculating unit 44 which calculates the timing of SSC operation stop, a limit to the vehicle speed, etc. in a case where this flag changes from (0) to (1), and the SSC operation is stopped according to the SSC operation inhibition flag input from the DSC system. The estimation of the road surface μ (road surface friction coefficient) which has an effect on the calculation of the SSC operation stop is performed in, for example, the target yaw rate calculating unit 41.

The target yaw rate calculating unit 41 calculates the target yaw rate by a well-known technique on the basis of signal data, such as the steering angle and the steering speed. The traveling state determination calculating unit 42 compares the target yaw rate with the actual yaw rate, compares the difference between both yaw rates with a threshold value for oversteering and a threshold value for understeering, and if exceeding the threshold values or falling below the threshold values, performs oversteering determination or understeering determination to perform respective determination flags thereof.

The SSC OS compensation target steering control variable calculating unit 43 calculates the target steering control variable of the oversteering (OS) compensation by the SSC function, on the basis of the acquired signal data, target yaw rate, and road surface μ estimation value, at the time of the occurrence of oversteering (OS), and outputs an SSC request angle (original) to the SSC operation stop calculating unit 44.

The target yaw rate and road surface μ estimation value obtained in the target yaw rate calculating unit 41 are respectively input to the traveling state determination calculating unit 42, the SSC OS compensation target steering control variable calculating unit 43, and the SSC operation stop calculating unit 44. In a case where there is the oversteering (OS) determination or understeering (US) determination in the SSC control by the traveling state determination calculating unit 42, an OS determination flag or a US determination flag is input to the SSC operation stop calculating unit 44. Moreover, the target steering control variable of the oversteering (OS) compensation by the SSC function by the SSC OS compensation target steering control variable calculating unit 43, i.e., the SSC request angle of the oversteering is also input to the SSC operation stop calculating unit 44. In the SSC operation stop calculating unit 44, the SSC request angle after the SSC operation stop is calculated on the basis of the above input data, and a request value is output to the steering control ECU 20.

FIGS. 6 and 7 are block diagrams for explaining the outline of the control by the SSC operation stop calculating unit 44 provided within the steering assist control calculating unit 40 for oversteering. As shown in these FIGS. 6 and 7, the SSC operation stop calculating unit 44 includes an SSC operation stop timing determination unit 45 which determines the timing (delay time) with which the steering assist control calculating unit 40 for oversteering is made to stop the SSC operation actually after the SSC operation inhibition flag changes from (0) to (1), and an SSC operation stop speed limit determination unit 46 which determines the limit value of the stop speed when the SSC operation is stopped.

The SSC operation stop calculating unit 44 includes an SSC operation stop timing delay calculating unit 47 which performs the delay calculation of SSC operation stop timing (which will be described later) according to the SSC operation inhibition flag (DSC OS determination flag) and the output data of SSC operation stop delay time from the operation stop timing determination unit 45, an SSC operation stop speed limit calculating unit 48 which performs the calculation of the SSC operation stop speed limit (which will be described later) according to the input of the SSC operation inhibition flag and the output data of the SSC operation stop speed limit value from the operation stop speed limit determination unit 46, thereby outputting an SSC operation stop coefficient.

As will be described later, the SSC request angle after an operation stop is output to the steering control ECU 20, on the basis of the SSC operation stop coefficient from the SSC operation stop speed limit calculating unit 48, and an original SSC request angle.

A broken line graph within a block of the SSC operation stop timing delay calculating unit 47 shown in FIG. 7 schematically represents the operation stop timing before delay, and a solid line graph schematically represents the operation stop timing after delay. Additionally, a broken line graph within a block of the SSC operation stop speed limit calculating unit 48 schematically represents the operation stop speed before a speed limit, and a solid line graph schematically represents the operation stop speed after a speed limit.

As shown in FIG. 6, the timing (delay time) of the SSC operation stop by the operation stop timing determination unit 45 is determined using predetermined maps for delay, according to the vehicle speed, the steering speed, a yaw rate deviation (the deviation between the target yaw rate and the actual yaw rate), and the road surface μ estimation value. Additionally, the limit value of the stop speed at the time of the SSC operation stop by the operation stop speed limit determination unit 46 is determined using predetermined maps for stop speed limit, according to the vehicle speed, the steering speed, the yaw rate deviation, and the road surface μ estimation value. These maps are stored in, for example, an ROM attached to the steering assist control calculating unit 40 for oversteering. Since the steering speed generally has many noises, the steering speed is input to the steering assist control calculating unit 40 for oversteering via a low-pass filter Fp.

Figure 10:
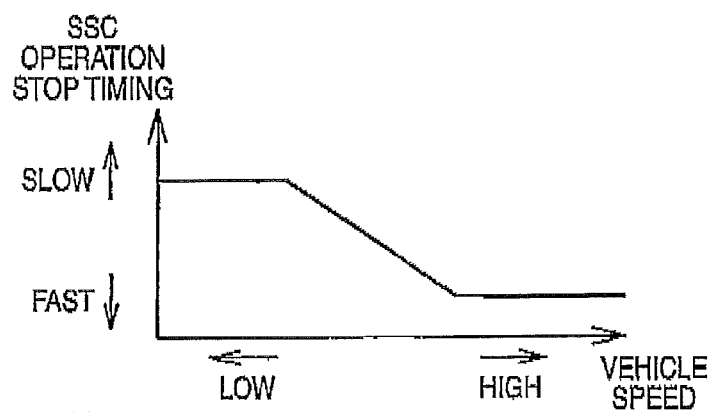
FIGS. 10A to 10D are views showing examples of maps for delay used in an SSC operation stop timing determination unit of the SSC operation step calculating unit.
Figure 10:
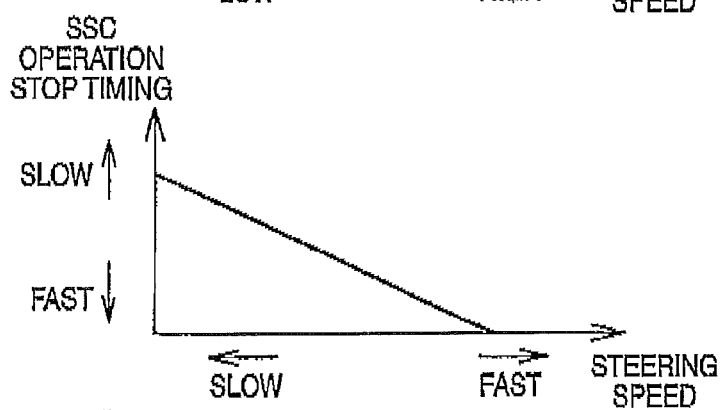
Figure 10:
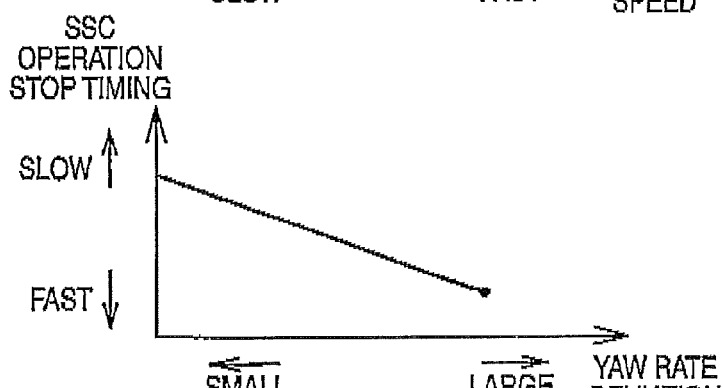
Figure 10:
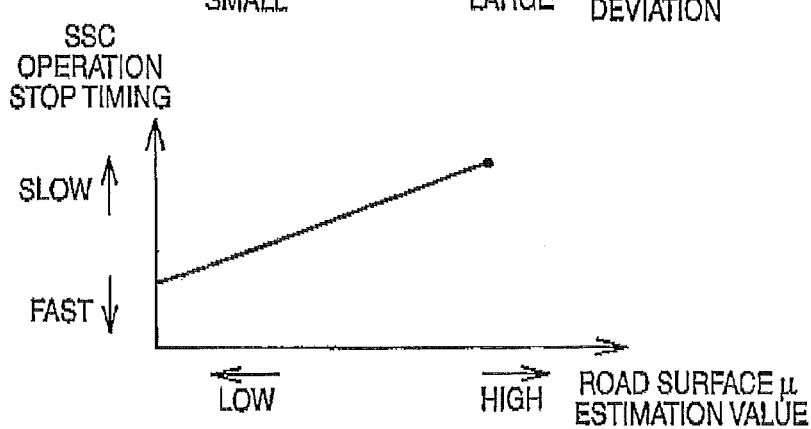

FIGS. 10A to 10D are views showing examples of maps for delay used in the SSC operation stop timing determination unit 45. FIG. 10A shows an example of a map showing dependency of the SSC operation stop timing upon the vehicle speed. FIG. 10B shows an example of a map showing dependency of the SSC operation stop timing upon the steering speed. FIG. 10C shows an example of a map showing dependency of the SSC operation stop timing upon the yaw rate deviation. FIG. 10D shows an example of a map showing dependency of the SSC operation stop timing upon the road surface μ estimation value.

In the vehicle speed dependent map of FIG. 10A, the SSC operation stop timing has a slow constant value below a range where there is a vehicle speed. If this vehicle speed is exceeded, however, the timing becomes fast substantially linearly according to an increase in the vehicle speed, and if the vehicle speed further increases, the SSC operation stop timing becomes a fast constant value. In the steering speed dependent map of FIG. 10B, the timing becomes fast substantially linearly according to an increase in the steering speed. In the yaw rate deviation dependent map of FIG. 10C, the timing becomes fast as the yaw rate becomes large, and the timing becomes the fastest at a maximum value of the yaw rate deviation. Additionally, the road surface μ estimation value dependent map of FIG. 10D, the timing becomes slow substantially linearly as the road surface μ estimation value becomes high, and the timing becomes the slowest at a maximum value of the road surface μ estimation value.

The SSC operation stop timing determination unit 45 obtains delay times according to the vehicle speed, the steering speed, the yaw rate deviation, and the road surface μ estimation value, using the above maps for delay of FIGS. 10A to 10D, and determines the SSC operation stop timing with a minimum value of the delay times as a delay time.

Figure 11:
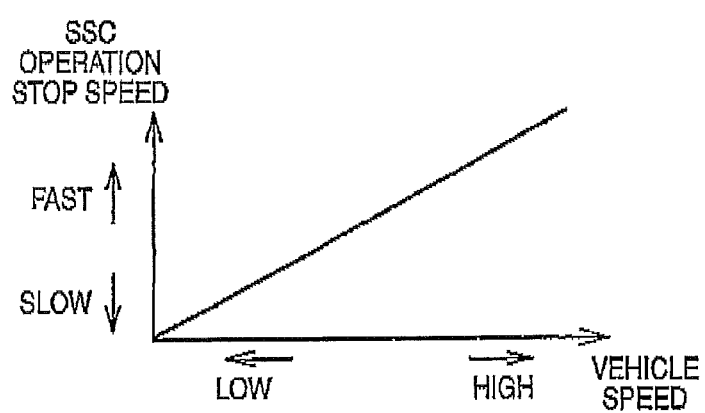
FIGS. 11A to 11D are views showing example of maps for speed limit used in an SSC operation stop speed limit value determination unit of the SSC operation stop calculating unit.
Figure 11:
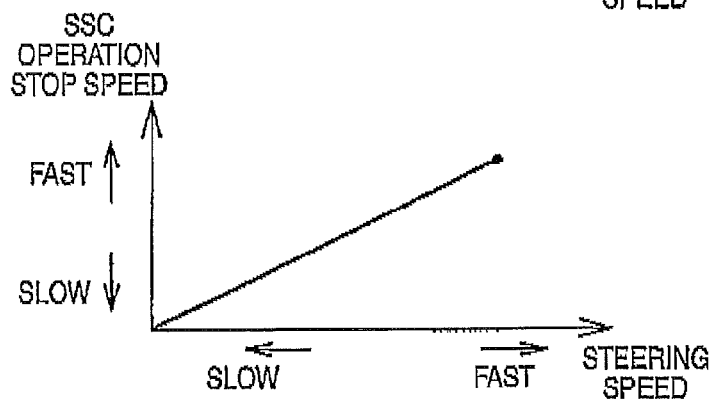
Figure 11:
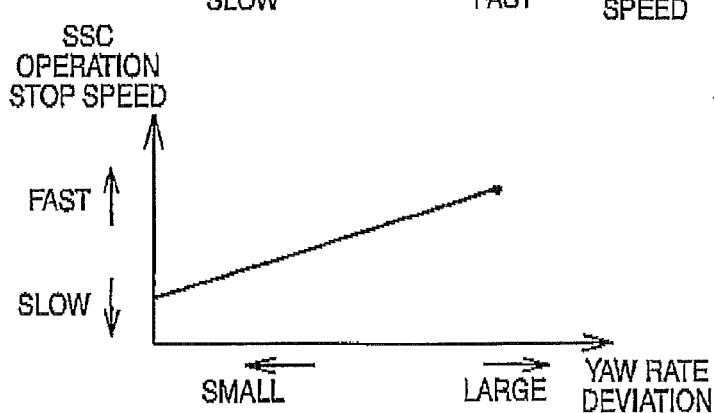
Figure 11:
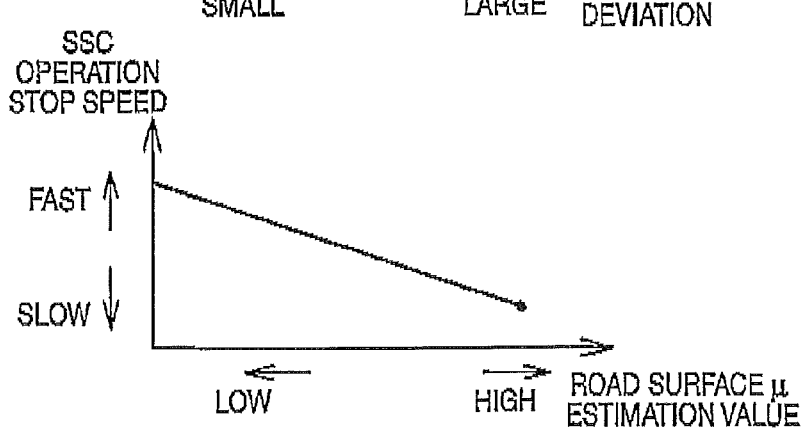

FIGS. 11A to 11D are views showing examples of maps for speed limit used in the SSC operation stop speed limit value determination unit 46, FIG. 11A shows an example of a map of the SSC operation stop speed limit dependent upon the vehicle speed. FIG. 11B shows an example of a map of the SSC operation stop speed limit dependent upon the steering speed. FIG. 11C shows an example of a map of the SSC operation stop speed limit dependent upon the yaw rate deviation, and FIG. 10D shows an example of a map of the SSC operation stop speed limit dependent upon the road surface μ estimation value.

In the vehicle speed dependent map of FIG. 11A, the limit value of the operation stop speed becomes faster substantially linearly as the vehicle speed increases. In the steering speed dependent map of FIG. 11B, the limit value of the operation stop speed becomes faster substantially linearly according to an increase in the steering speed, and the limit value of the operation stop speed becomes the fastest at a maximum value of the steering speed. In the yaw rate deviation dependent map of FIG. 11C, the limit value of the operation stop speed becomes faster substantially linearly as the yaw rate deviation becomes large, and the limit value of the operation stop speed becomes the fastest at a maximum value of the yaw rate deviation. Additionally, in the road surface μ estimation value dependent map of FIG. 11D, the limit value of the operation stop speed becomes slower substantially linearly as the road surface μ estimation value becomes high, and the limit value of the operation stop speed becomes the slowest at a maximum value of the road surface μ estimation value.

The operation stop speed limit determination unit 46 obtains limit values of the operation stop speed according to the vehicle speed, the steering speed, the yaw rate deviation, and the road surface μ estimation value, using the above maps for speed limit of FIGS. 11A to 11D, and determines a minimum value of the limit values as the SSC operation stop speed limit value.

The operation control of the front wheel steering apparatus 10 configured as described above will be described, referring to the accompanying control flow charts.

Figure 12:
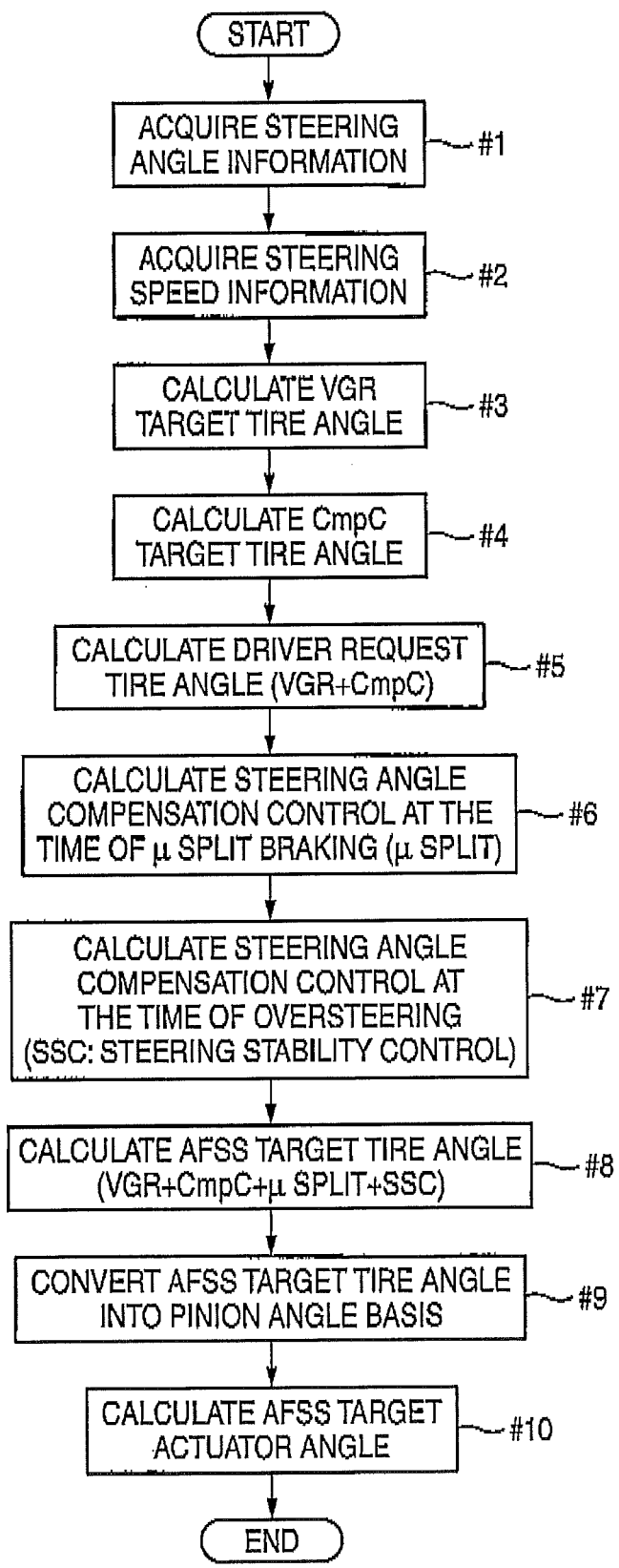
FIG. 12 is a flow chart for explaining the calculation processing of a target actuator angle in an AFS system of the front wheel steering apparatus.

FIG. 12 is a flow chart for explaining the calculation processing which calculates a request value of a target actuator angle (that is, the AFS motor angle shown in FIG. 3) in the AFS system (AFSS).

When a process is started, first, steering angle information and steering speed information are acquired on the basis of an output signal from the steering wheel sensor Sh (refer to FIG. 3), and are input to the CPU of the steering control ECU 20 shown in FIG. 3 (Steps #1 and #2).

Next, the VGR target (request) tire angle and the CmpC target (request) tire angle are respectively calculated in the VGR mechanism unit 21 and CmpC mechanism unit 22 of the steering control ECU 20 (Steps #3 and #4), and the driver target tire angle (VGR+CmpC) is calculated on calculation values of the VGR target tire angle and CmpC target tire angle in the driver target tire angle calculating unit 23 (Step #5).

In Step #6, the steering assist control variable at the time of split μ is calculated in the split μ steering assist control calculating unit 32 (refer to FIG. 4), and a compensation value (μ split compensation value) of the calculated steering angle is input to the target tire angle calculating unit 24 of the steering control ECU 20.

In Step #7 the steering assist control variable at the time of oversteering is calculated in the steering assist control calculating unit 40 (refer to FIG. 4) for oversteering, and the compensation value (SSC compensation value) of the calculated steering angle is input to the target tire angle calculating unit 24 of the steering control ECU 20.

Then, in Step #8, the target tire angle in the AFS system (AFSS) is calculated on the basis of the above driver request tire angle (VGR+CmpC) calculation value, the μ split compensation value, and the SSC compensation value, in the target tire angle calculating unit 24 of the steering control ECU 20 (AFSS target tire angle=VGR+CmpC+μ split+SSC).

Thereafter, in Step #9, the AFSS target tire angle is converted into a pinion angle basis. This conversion, as mentioned above, is performed using Mechanical ratio Rm=Pinion angle/Tire angle (RWA).

Then, in Step #10, the request value of the AFSS target actuator angle (AFS motor angle) is calculated on the basis of the converted value of the AFSS target tire angle into the pinion angle basis in the AFS motor angle request value calculating unit 25.

Figure 13:
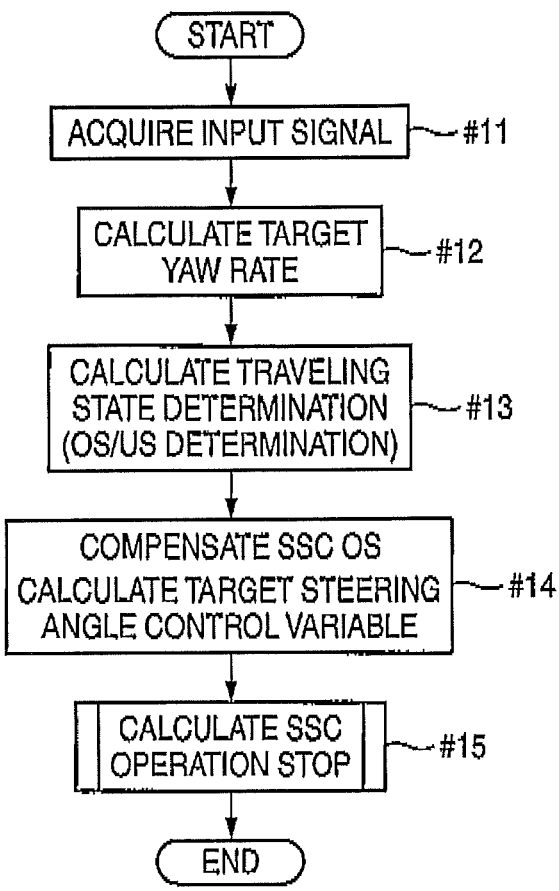
FIG. 13 is a flow chart for explaining the calculation processing of a steering assist control quantity at the time of the oversteering by the steering assist control calculating unit at the time of oversteering.

Next, the calculation of the steering assist control variable at the time of oversteering by the steering assist control calculating unit 40 (refer to FIG. 4) for oversteering will be described with reference to the flow chart of FIG. 13, in connection with the calculation processing in Step #7. As mentioned above, in this embodiment, the steering assist control calculating unit 40 for oversteering is provided within the braking and engine control ECU 30.

When the calculation processing is started, first, as shown in FIG. 5, the input signals of the steering angle, the steering speed, the driver target tire angle, the vehicle speed, the yaw rate and the actual lateral acceleration are acquired, and the SSC operation inhibition flag output from the ABS/DSC/TCS calculating unit 31 is further acquired (Step #11). Next, in Step #12, the target yaw rate is calculated in the target yaw rate calculating unit 41 on the basis of the acquired signal data (refer to FIG. 5). The estimation of the road surface μ is also performed in the target yaw rate calculating unit 41. The estimation value of the road surface μ and the target yaw rate are respectively input to the traveling state determination calculating unit 42, the SSC OS compensation target steering control variable calculating unit 43, and the SSC operation stop calculating unit 44.

Next, in Step #13, the determination calculation (the determination calculation of oversteering (OS)/understeering (US)) of the traveling state in the SSC control is performed in the traveling state determination calculating unit 42, and the SSC OS/US determination flag is input to the SSC operation stop calculating unit 44.

In Step #14, the target steering control variable of the oversteering (OS) compensation by the SSC function at the time of the occurrence of oversteering (OS) is calculated in the SSC OS compensation target control variable calculating unit 43, and is input to the SSC operation stop calculating unit 44 as an SSC request angle (original) that is the steering control request angle of an original by the SSC control, on the basis of this calculation value.

Then, in Step #15, an SSC operation stop calculation subroutine where the timing of the SSC operation stop, the vehicle speed limit, etc. are calculated in the SSC operation stop calculating unit 44 in a case where the SSC operation inhibition flag changes from (0) to (1) is executed.

Figure 14:
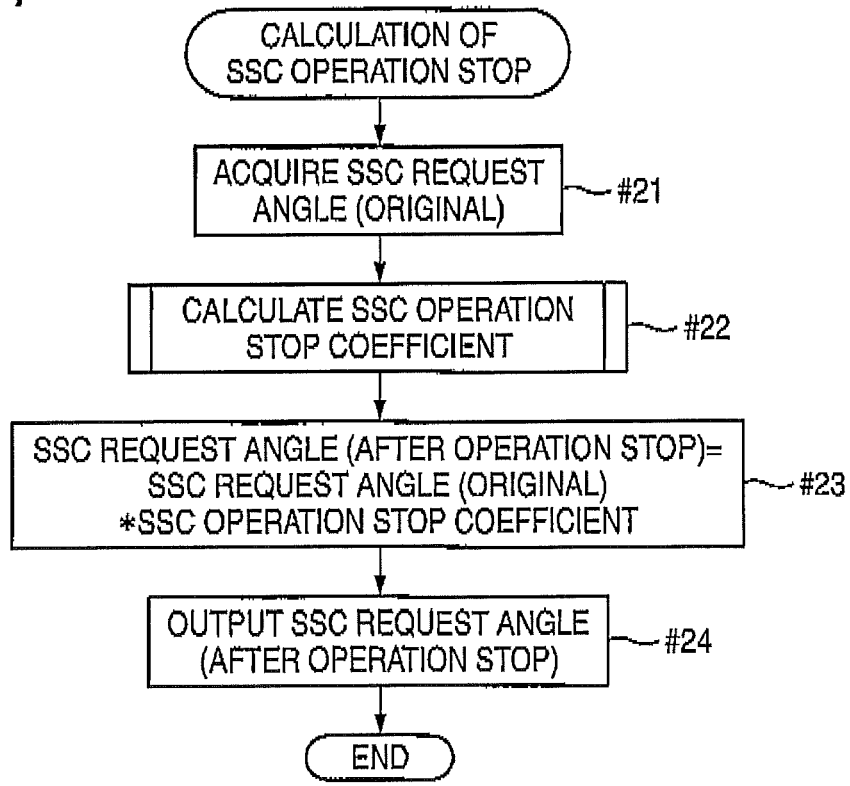
FIG. 14 is a flow chart for explaining an SSC operation stop calculation subroutine.

FIG. 14 is a flow chart for explaining the SSC operation stop calculation subroutine (Step 415).

When the execution of this subroutine is started, first, the SSC request angle (original) is acquired from the SSC OS compensation target steering control variable calculating unit 43 (Step #21), and then, an SSC operation stop coefficient calculation subroutine (which will be described later) is executed to calculate the SSC operation stop coefficient (Step #22). Then, the SSC request angle (after an operation stop) that is the SSC request angle after an SSC operation stop by multiplying the SSC request angle (original) by the SSC operation stop coefficient (Step 23), and this calculation value is output to the steering control ECU 20.

Figure 15:
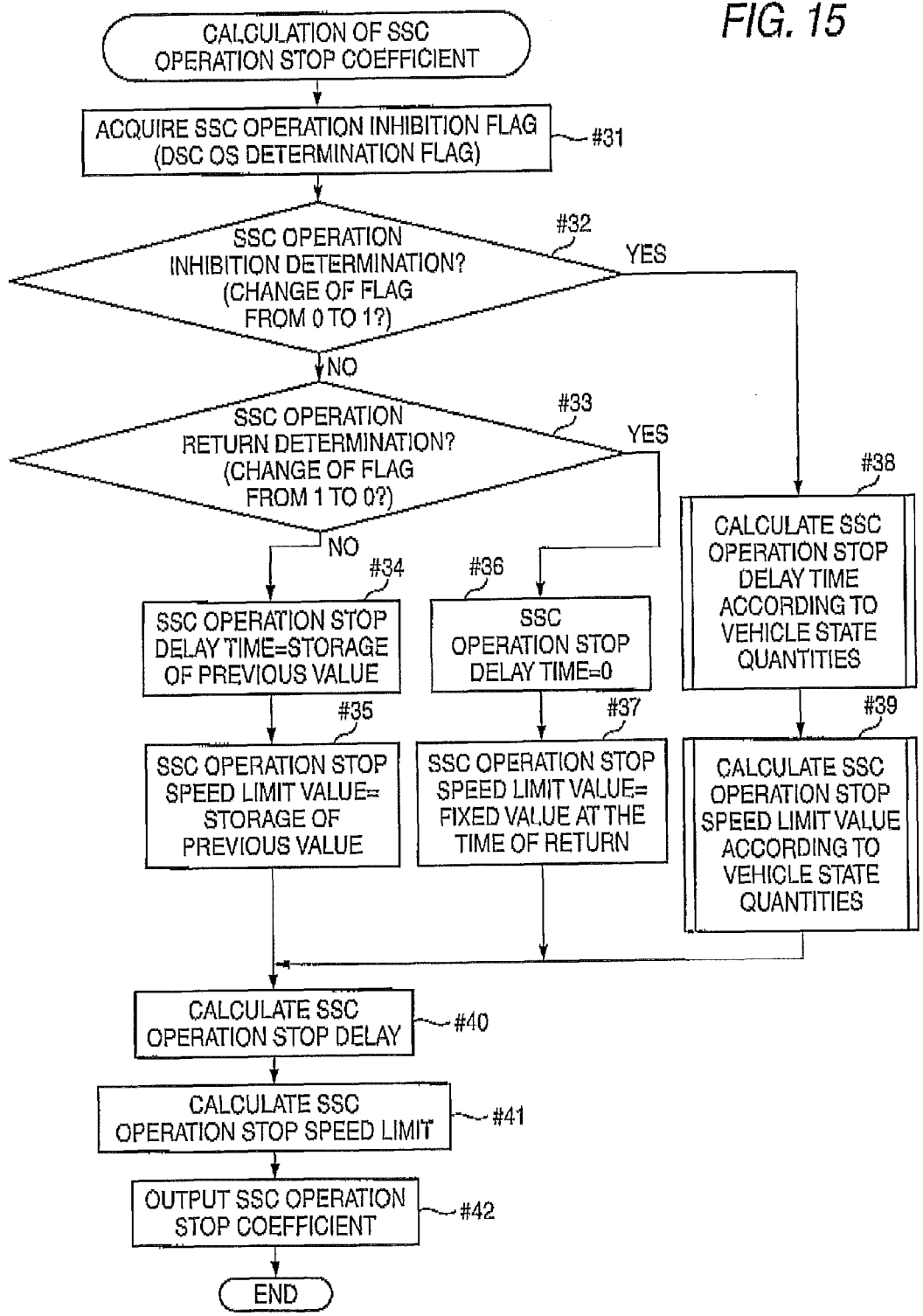
FIG. 15 is a flow chart for explaining SSC operation stop coefficient calculation subroutine.

FIG. 15 is a flow chart for explaining the SSC operation stop coefficient calculation subroutine (Step #22).

When the execution of this subroutine is started, first, the SSC operation inhibition flag (DSC OS determination flag) is acquired in Step #31, and it is determined whether or not the SSC operation inhibition flag has changed from (0) to (1) in Step #32.

If the determination result of this Step #32 is NO, it is determined in Step #33 whether or not there has been any SSC operation carriage return determination, i.e., whether the SSC operation inhibition flag has returned from (1) to (0). If the determination result is NO, both the SSC operation stop delay time and the SSC operation stop speed limit value are stored as previous values (Steps #34 and #35). Then, SSC operation stop delay calculation and SSC operation stop speed limit calculation are executed (Steps #40 and #41) and the SSC operation stop coefficient is output (Step #42).

On the other hand, if the determination result in Step #33 is YES, setting is made such that the SSC operation stop delay time is fixed to 0 (zero), and the SSC operation stop speed limit value is fixed to a value at the time of return (Steps #36 and #37). Thereafter, respective steps from Step #40 to Step #42 are executed.

If the determination result of Step #32 is YES, an SSC operation stop delay time calculation subroutine according to vehicle state quantities, and an SSC operation stop speed limit value calculation subroutine according to vehicle state quantities are executed (Step #38 and #39). Thereafter, respective steps from Step #40 to Step #42 are executed.

Figure 16:
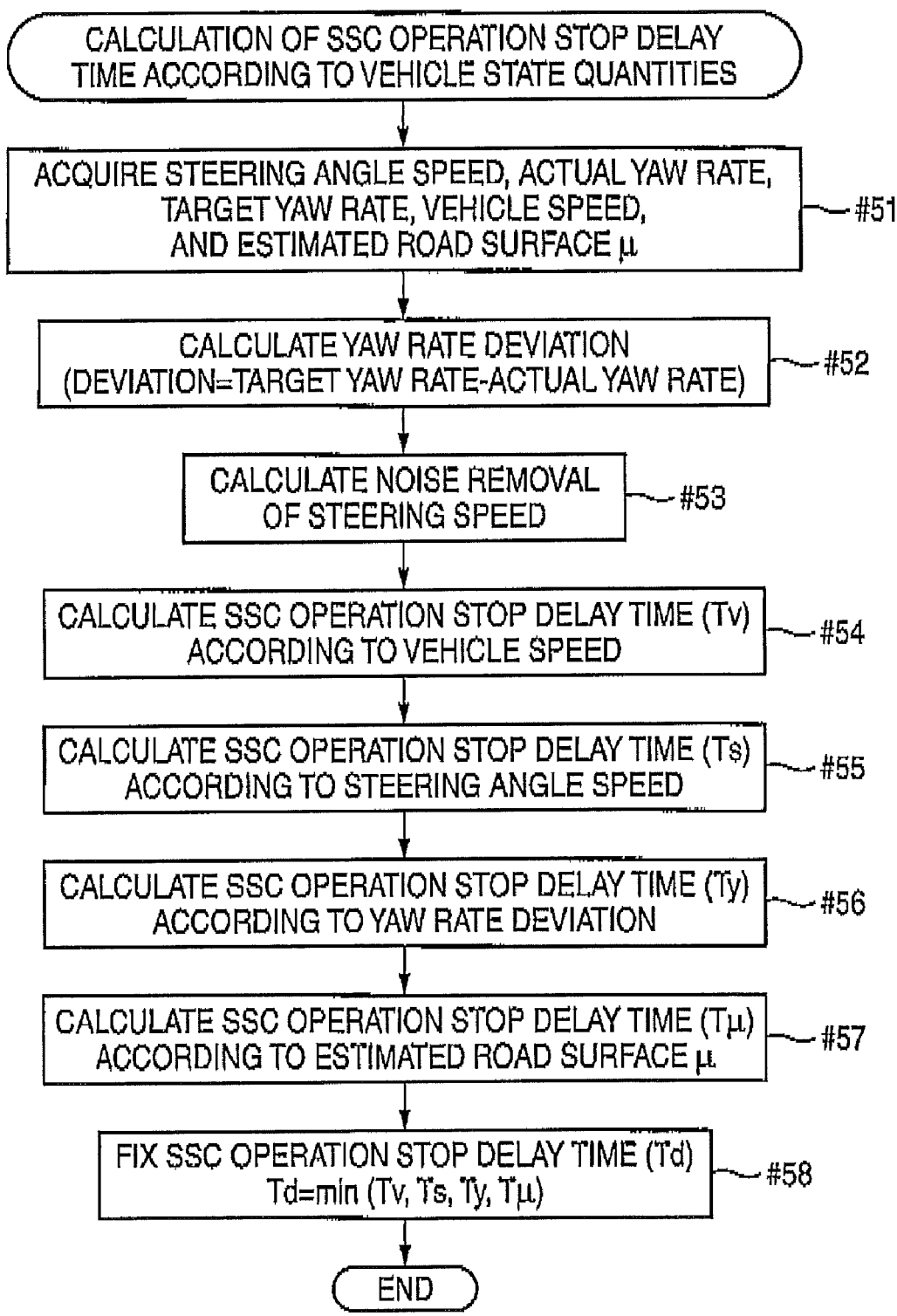
FIG. 16 is a flow chart for explaining an SSC operation stop delay time calculation subroutine according to vehicle state quantities.

FIG. 16 is a flow chart for explaining the SSC operation stop delay time calculation subroutine (Step #38) according to vehicle state quantities. This SSC operation stop delay time calculation subroutine according to vehicle state quantities is executed using maps of FIGS. 10A to 10D.

When the execution of this subroutine is started, first, the input data of the steering angle speed, yaw rate, target yaw rate, vehicle speed and surface road μ estimation value are acquired in Step #51, and the yaw rate deviation (Target yaw rate−Actual yaw rate) is calculated in Step #52. Noise removal calculation of the steering speed using the low-pass filter Fp (refer to FIG. 6) is performed in Step #53.

Next, in Step #54, an SSC operation stop delay time Tv according to vehicle speed is calculated using the map (refer to FIG. 10A) showing dependency of the SSC operation stop timing upon the steering speed. In Step #55, an SSC operation stop delay time Ts according to the steering angle speed is calculated using the map (refer to FIG. 10B) showing dependency of the SSC operation stop timing upon the yaw rate deviation. Moreover, in Step #56, an SSC operation stop delay time Ty according to the yaw rate deviation is calculated using the map (refer to FIG. 10C) showing dependency the SSC operation stop timing upon the yaw rate deviation.

In Step #57, an SSC operation stop delay time Tμ according to the road surface μ estimation value is calculated using the map (refer to FIG. 10D) showing dependency of the SSC operation stop timing upon the road surface μ estimation value.

Then, in Step #58, definite value Td=min (Tv, Ts, Ty, Tμ) of the SSC operation stop delay time is obtained by acquiring a minimum value of the above SSC operation stop delay times Tv, Ts, Ty, and Tμ.

Figure 17:
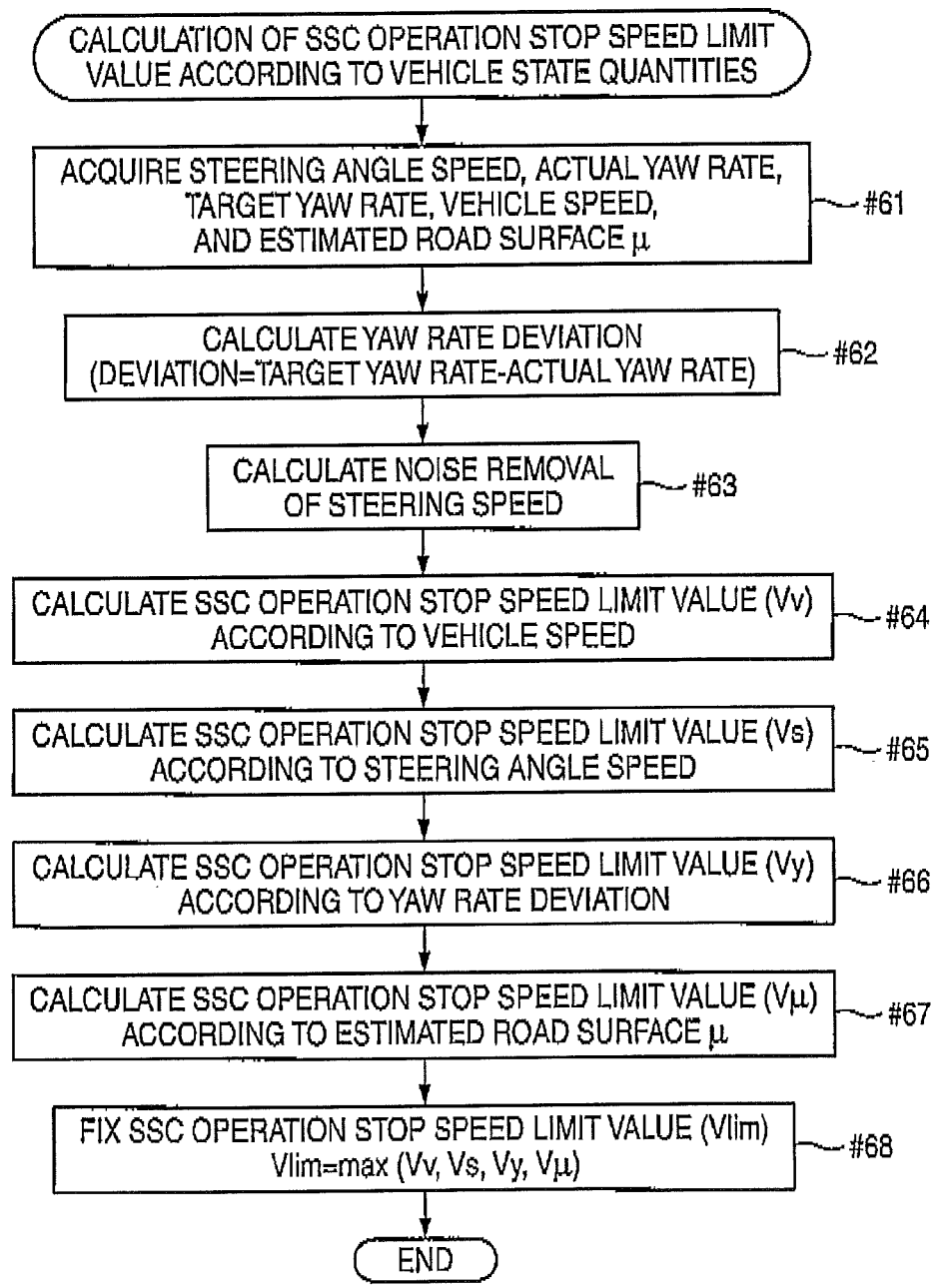
FIG. 17 is a flow chart for explaining an SSC operation stop speed limit value calculation subroutine according to vehicle state quantities.

FIG. 17 is a flow chart for explaining the SSC operation stop speed limit value calculation subroutine (Step #39) according to vehicle state quantities. This SSC operation stop speed limit value calculation subroutine according to vehicle states is executed using the maps of FIGS. 11A to 10D.

When the execution of this subroutine is started, first, the input data of the steering angle speed, yaw rate, target yaw rate, vehicle speed and surface road μ estimation value are acquired in Step #61, and the yaw rate deviation (Target yaw rate−Actual yaw rate) is calculated in Step #62. Noise removal calculation of the steering speed using the low-pass filter Fp (refer to FIG. 6) is performed in Step #63.

Next, in Step #64, an SSC operation stop speed limit value Vv according to the vehicle speed is calculated using the map (refer to FIG. 11A) showing dependency of the SSC operation stop speed limit value upon the vehicle speed. In Step #65, an SSC operation stop speed limit value Vs according to the steering angle speed is calculated using the map (refer to FIG. 11B) showing dependency of the SSC operation stop speed limit value upon the steering speed. Next, in Step 466, an SSC operation stop speed limit value Vy according to the yaw rate deviation is calculated using the map (refer to FIG. 11C) showing dependency of the SSC operation stop speed limit value upon the yaw rate deviation.

In Step #67, an SSC operation stop speed limit value Vμ according to the road surface μ estimation value is calculated using the map (refer to FIG. 11D) showing dependency of the SSC operation stop speed limit value upon the road surface μ estimation value.

Then, in Step #68, Definite value Vlim=max (Vv, Vs, Vy, Vμ) of the SSC operation stop speed limit value is obtained by acquiring a maximum value of the above SSC operation stop speed limit values Vv, Vs, Vy, and Vμ.

Figure 18:
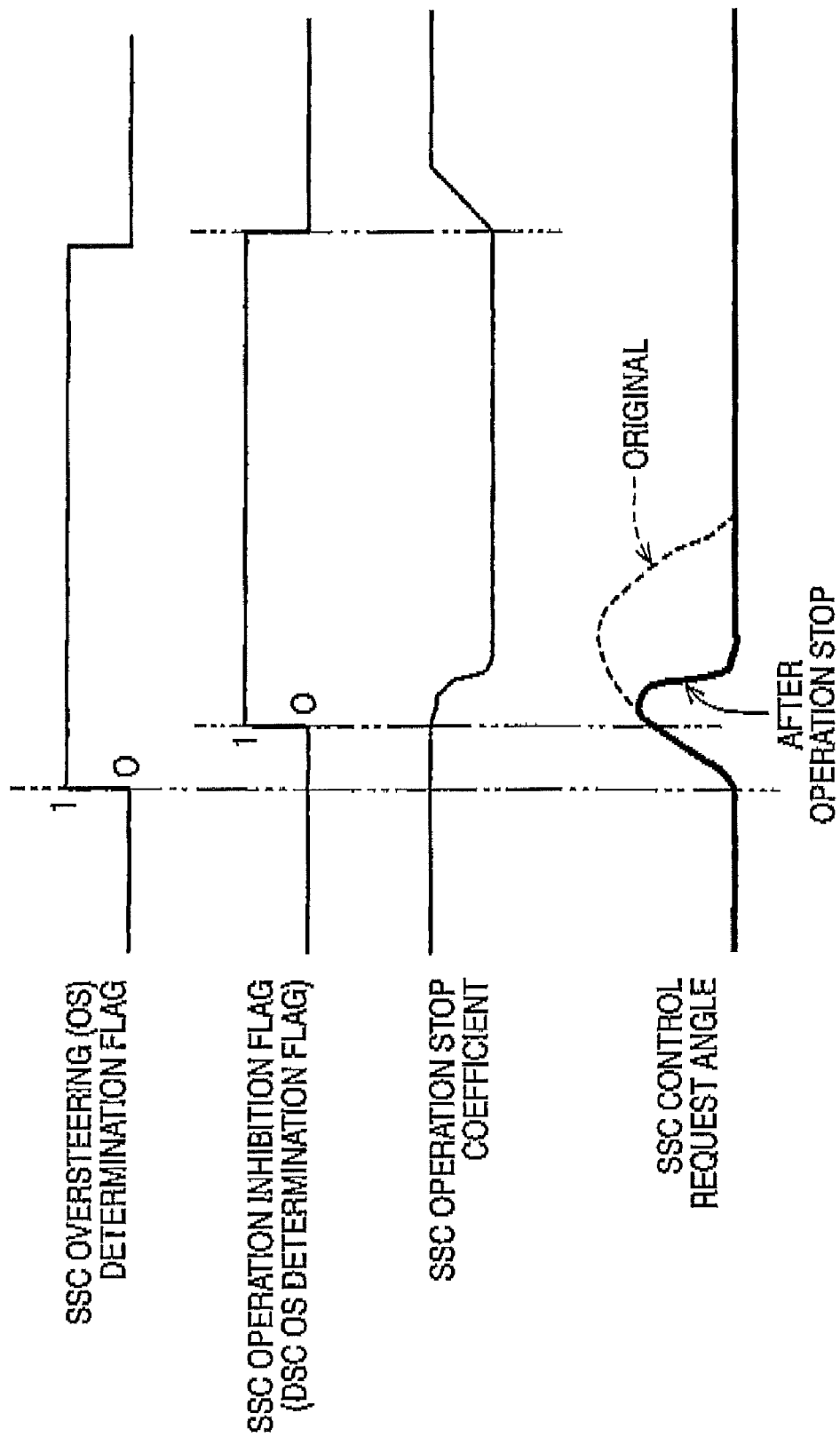
FIG. 18 is a timing chart regarding the change of an SSC oversteering (OS) determination flag, the change of an SSC operation inhibition flag, the change of an SSC operation stop coefficient, the change of an SSC request angle in SSC operation stop control.

FIG. 18 is a timing chart schematically illustrating the timings with which individual changes occur, regarding the change of the SSC oversteering (OS) determination flag, the change of the SSC operation inhibition flag, the change of the SSC operation stop coefficient, and the change of the SSC request angle in the SSC operation stop control.

As shown in this drawing, with respect to the occurrence of oversteering of the vehicle, the SSC oversteering determination by the SSC system is performed faster than the oversteering determination by the DSC system. That is when a certain degree of time has passed after the SSC oversteering determination flag has changed from (0) to (1), the DSC oversteering determination flag (SSC operation inhibition flag) changes from (0) to (1).

The SSC request angle rises with the SSC oversteering determination by the SSC system. If the SSC operation inhibition flag is still (0), the SSC request angle becomes large as shown by a broken line (original). However, as the SSC operation inhibition flag changes to (1), the SSC request angle falls as shown by a solid line due to the SSC operation stop coefficient, and the operation of SSC is stopped.

Figure 19:
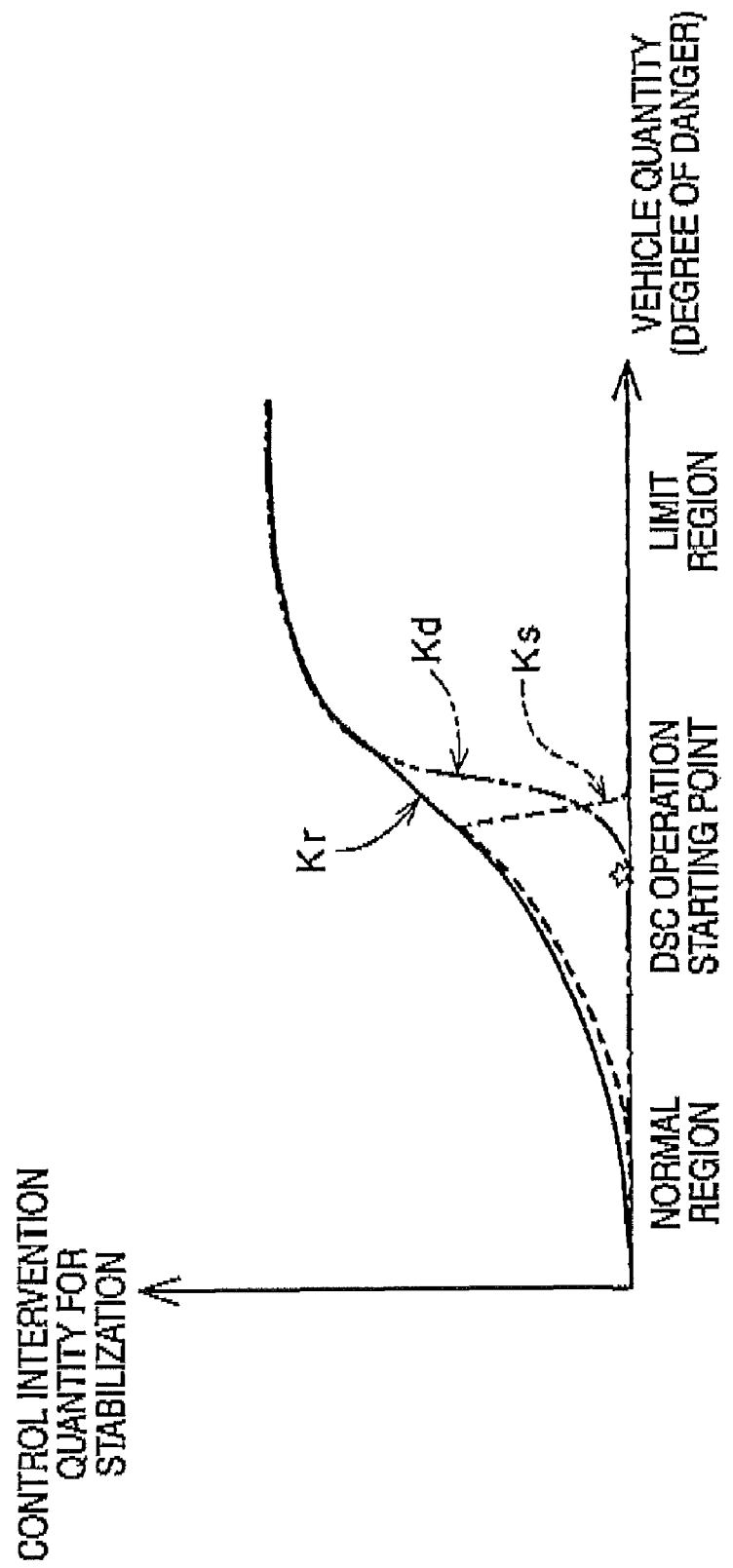
FIG. 19 is a graph schematically illustrating a control intervention quantity for stabilization in a case where a vehicle state reaches a limit region of oversteering from a normal region.

FIG. 19 is a graph schematically illustrating a control intervention quantity (i.e., a yaw moment compensation quantity by the steering angle control and braking force control) for stabilization in a case where a vehicle state reaches a limit region of oversteering from a normal region. In this drawing, a broken line curve Ks represents the control intervention quantity in a case where the steering angle control (i.e., SSC control) is independently performed, and a two-dot chain-line curve Kd represents the control intervention quantity in a case where the braking force control (i.e., DSC control) is independently performed. Additionally, a solid line curve Kr represents a control intervention quantity which is regarded as ideal.

As can be seen from FIG. 19, in this embodiment, in a case where oversteering has occurred at the time of turning manipulation when the motion control of a vehicle at the time of the turning manipulation is performed by combining the steering angle control with the braking force control, the steering of the driver is assisted only by the SSC control in a region from the normal region to a region where the compensation quantity of the yaw moment is relatively small. When the required compensation quantity of the yaw moment becomes a certain degree or more, and enters a limit region which exceeds the operation limit of the SSC control system, the operation of the DSC control system is started. In response to this start, the SSC control is preferably stopped with some delay. Since control is made based on a control intervention quantity obtained by the sum of the control intervention quantity Kd in the DSC control system and the control intervention quantity Ks in the SSC control system, the control based on the control intervention quantity very close to the solid line curve Kr representing a control intervention quantity which is regarded ideal is realized.

As described above, in this embodiment, preferably, in a case where oversteering has occurred at the time of turning manipulation, the stability of the vehicle behavior can be ensured by the following control. In the normal region and in a region from the region where the compensation quantity of the yaw moment is relatively small to the limit region where the yaw rate deviation becomes large and exceeds the operation limit of the SSC control, the steering of the driver is assisted by the SSC control, while in the limit region, the braking force over the steered wheel is controlled by the DSC control operations. Moreover, since the control of the SSC system is stopped by detecting the timing with which the DSC control system detects the oversteering state of the vehicle to start the DSC control, the driver can be effectively kept from feeling a sense of incompatibility when manipulating the steering wheel in the oversteering limit region. In the limit region, the DSC control is not used together with the SSC control unlike the conventional technique, but acts independently. Thus, the convergence of control when the braking force control by the DSC control is completed also improves significantly.

Since the control transition timing is preferably changed (delayed) by the SSC operation stop timing delay calculating unit 47 at the time of control stop of the SSC control system, the transition (stop) timing of the SSC control can be suitably set according to the driving conditions of the vehicle. Especially, the transition timing of control can be suitably set according to at least one of the vehicle speed, the steering speed, and the yaw rate deviation, the road surface friction coefficient that are state quantities which have an effect on the stability of vehicle behavior.

Moreover, preferably, since the control variables of the SSC control are gradually changed by the SSC operation stop speed limit calculating unit 48 at the time of control stop of the SSC control system, the transition of control can be suitably performed by suppressing a sudden change in the control variables according to driving conditions, etc. of the vehicle. Especially, the transition timing of control can be suitably set according to at least one of the vehicle speed, the steering speed, the yaw rate deviation, and the road surface friction coefficient that are state quantities which have an effect on the stability of vehicle behavior.

In a case where the DSC control and the SSC control are used together in the limit region of oversteering like the conventional technique, it is necessary to allow the cooperation control of both the DSC system and the SSC system, and a large amount of time and cost will be required for both development and tuning. However, in this embodiment, preferably, the DSC system and the SSC system are not used together, but the respective systems can be independently developed and tuned, and the time and cost required for development can be significantly suppressed.

In the above embodiment, in a case where oversteering has occurred at the time of turning, the steering assist control calculating unit 40 for oversteering which calculates a steering assist control variable for eliminating the unstable behavior of the vehicle caused by the oversteering is provided in the braking and engine control ECU 30 as a so-called steering stability control (SSC) function. However, the invention is not limited to such a configuration, and the steering assist control calculating unit at the time of oversteering may be provided in the steering control ECU.

Next, a further embodiment of the invention will be described.

In the following description, the components which have the same configurations and perform the same operations as those in the above-described embodiment are denoted by the same reference numerals, and description thereof will be omitted.

Figure 20:
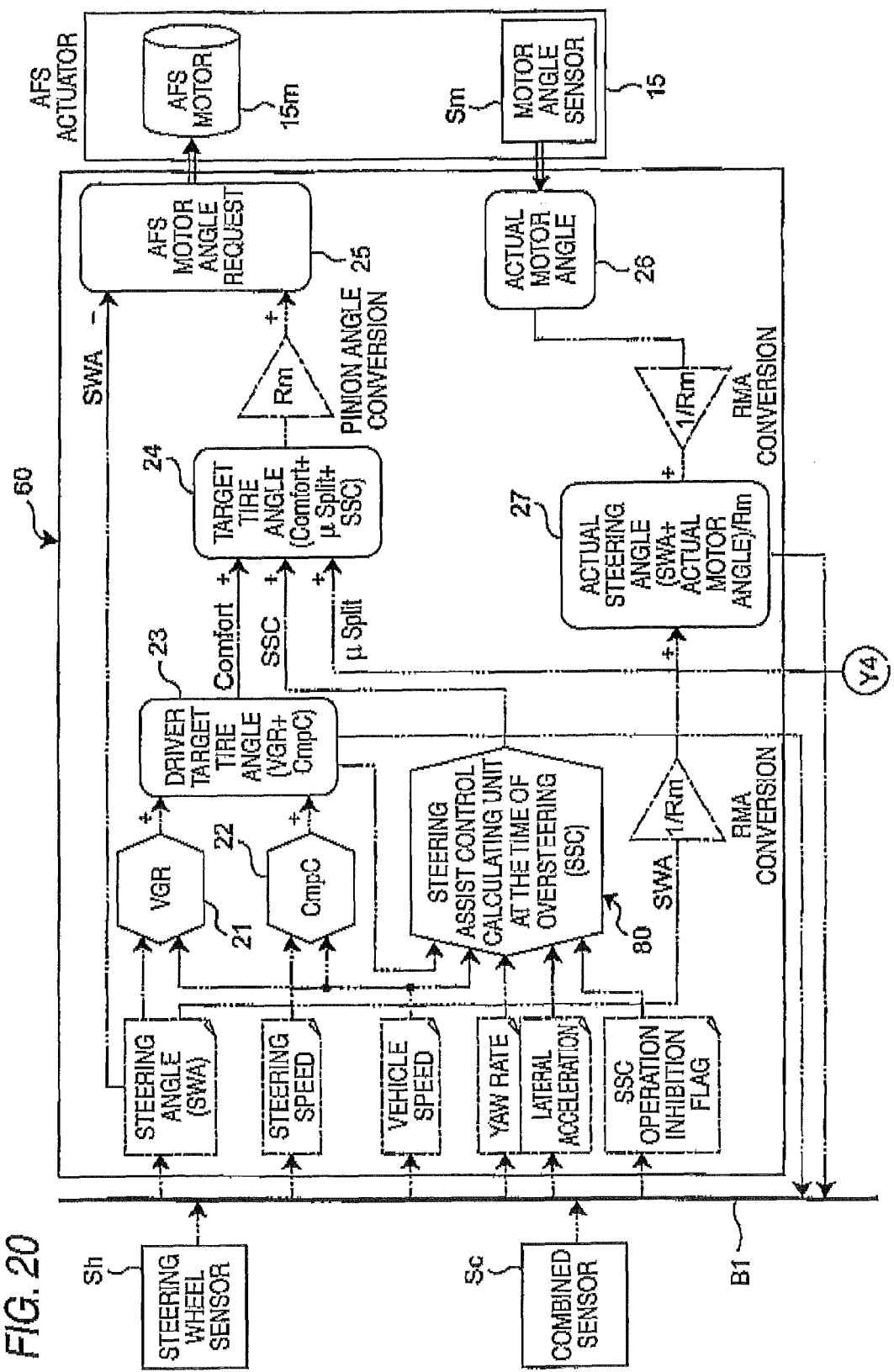
FIG. 20 is a block diagram for explaining the outline of the front wheel steering control by a steering control ECU according to a further embodiment of the invention.
Figure 21:
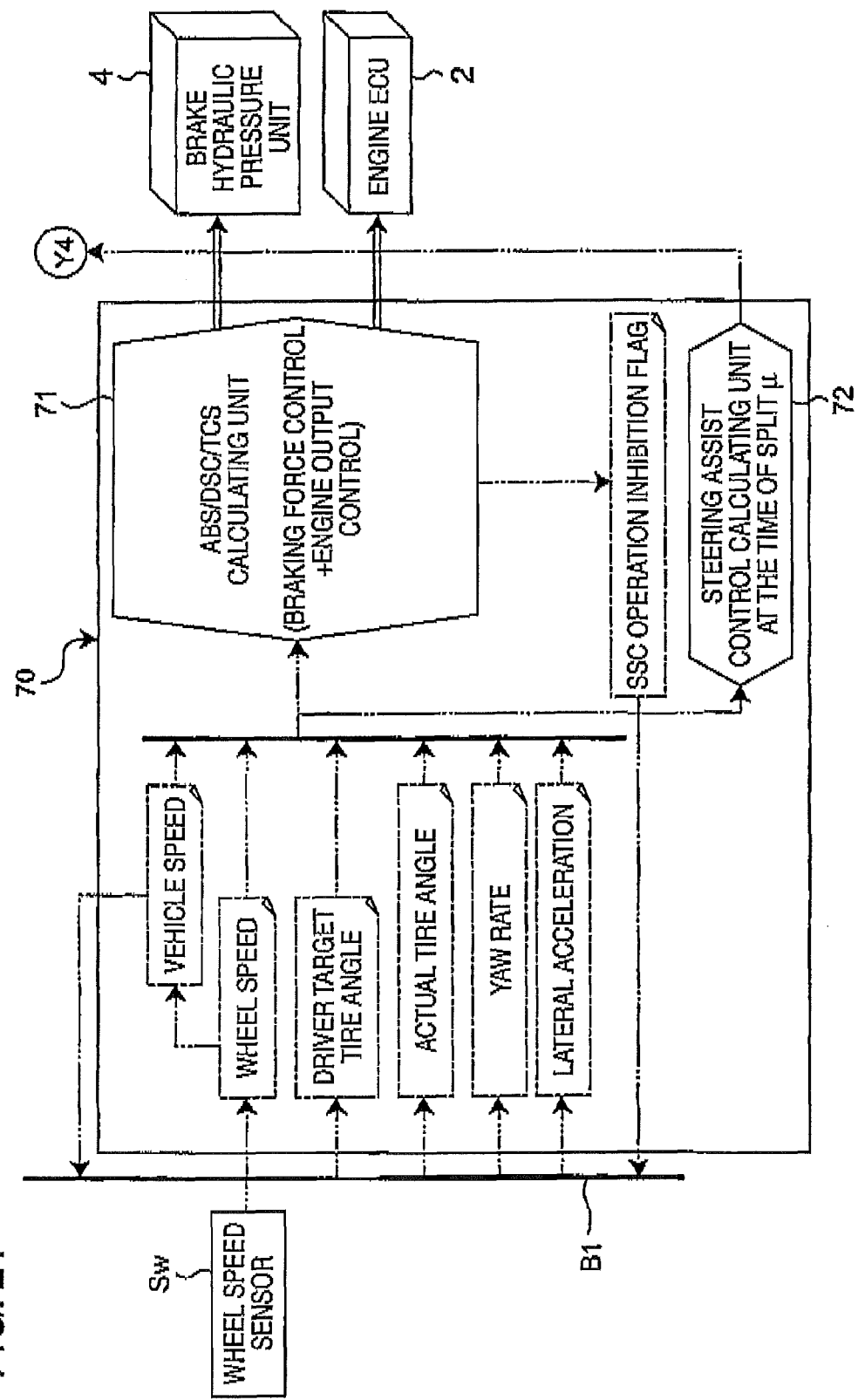
FIG. 21 is a block diagram for explaining the outline of the braking and engine control by a braking and engine control ECU according to the further embodiment.

FIG. 20 is a block diagram for explaining the outline of the front wheel steering control by the steering control ECU according to a further embodiment of the invention. Additionally, FIG. 21 is a block diagram for explaining the outline of the braking and engine control by the braking and engine control ECU according to the further embodiment.

As shown in these drawings, in this further embodiment, a steering assist control calculating unit 80 for oversteering which calculates the steering assist control variable for eliminating the unstable behavior of the vehicle is provided not within the braking and engine control ECU 70 but within the steering control ECU 60, and calculation data is input directly to the target tire angle calculating unit 24 within the steering control ECU 60. In the case, an SSC operation inhibition flag from an ABS/DSC/TCS calculating unit 71 is input to the steering assist control calculating unit 80 for oversteering via a bus 1. The calculation data by the split μ steering assist control calculating unit 72 is input directly to the target tire angle calculating unit 24 within the steering control ECU 60, similarly to the above-described embodiment.

In a case where such a configuration has been adopted, the same operational effects as in the above-described embodiment are obtained.

In addition, all of the above descriptions relate to the case where the control of a steering angle controller (SSC control system) is stopped, on the basis of having detected the timing with which a braking force controller (DSC control system) detects the oversteering state of the vehicle to start a braking force control. However, the invention is not limited to a case where control is stopped, and can be effectively applied to a case where stopped control is returned.

Of course, the invention is not limited to the above embodiments, and alternations and improvements can be made without departing from the concept of the invention.

The invention relates to a motion control device which controls the motion of a vehicle at the time of turning manipulation in vehicles, such as an automobile. Particularly, the invention can be effectively utilized as a motion control device which can suitably stabilize the behavior of the vehicle at the time of occurrence of oversteering.

What is claimed is:

1. A motion control device of a vehicle comprising:
a steering angle controller which controls a steering angle of a steered wheel so that an actual turning controlling variable becomes a target turning controlling variable;
a braking force controller which controls a vehicle braking force so that the actual turning controlling variable becomes the target turning controlling variable;
a steering assist calculating unit configured to stop controlling the steered wheel based on a timing with which the braking force controller detects an oversteering state of the vehicle to start a braking force control,
wherein the steering assist calculating unit performs both the control of the steering angle by the steering angle controller and the control of the vehicle braking force by the braking force controller for a predetermined delay time after the timing with which the braking force control is started, and
wherein the steering assist calculating unit stops the control of the steering angle by the steering angle controller when the predetermined delay time has passed.

2. The motion control device according to claim 1 further comprising a control transition timing changing unit which changes the predetermined delay time at the time of control stop or control return of the steering angle controller.

3. The motion control device according to claim 2, wherein the control transition timing changing unit changes the predetermined delay time according to at least one of a vehicle body speed, a steering speed, a yaw rate deviation and a road surface friction coefficient.

4. The motion control device according to claim 3 further comprising a controlling variable changing unit which gradually changes a controlling variable of the steering angle controller at the time of control stop or control return of the steering angle controller.

5. The motion control device according to claim 4, wherein the controlling variable changing unit gradually changes the controlling variable of the steering angle controller according to at least one of the vehicle body speed, the steering speed, the yaw rate deviation, and the road surface friction coefficient.

6. The motion control device according to claim 2 further comprising a controlling variable changing unit which gradually changes a controlling variable of the steering angle controller at the time of control stop or control return of the steering angle controller.

7. The motion control device according to claim 6, wherein the controlling variable changing unit gradually changes the controlling variable of the steering angle controller according to at least one of a vehicle body speed, a steering speed, a yaw rate deviation, and a road surface friction coefficient.

8. The motion control device according to claim 2, wherein the control transition timing changing unit changes the predetermined delay time so that the predetermined delay time in the case that a vehicle speed of the vehicle is relatively high is shorter than the predetermined delay time in the case that the vehicle speed is relatively low.

9. The motion control device according to claim 2, wherein the control transition timing changing unit changes the predetermined delay time so that the predetermined delay time in the case that a steering speed of a steering wheel is relatively high is shorter than the predetermined delay time in the case that the steering speed is relatively low.

10. The motion control device according to claim 2, wherein the control transition timing changing unit changes the predetermined delay time so that the predetermined delay time in the case that a deviation between the target turning control variable and the actual turning control variable is relatively high is shorter than the predetermined delay time in the case that the deviation is relatively low.

11. The motion control device according to claim 2, wherein the control transition timing changing unit changes the predetermined delay time so that the predetermined delay time in the case that a road surface $\mu$ estimation value is relatively high is shorter than the predetermined delay time in the case that the road surface $\mu$ estimation value is relatively low.

12. The motion control device according to claim 1 further comprising a controlling variable changing unit which gradually changes a controlling variable of the steering angle controller at the time of control stop or control return of the steering angle controller.

13. The motion control device according to claim 12, wherein the controlling variable changing unit gradually changes the controlling variable of the steering angle controller according to at least one of a vehicle body speed, a steering speed, a yaw rate deviation, and a road surface friction coefficient.

* * * * *